United States Patent
Yaros

(10) Patent No.: US 10,282,177 B2
(45) Date of Patent: May 7, 2019

(54) APPLICATION USER INTERFACE OVERLAYS FOR APPLICATION LIFECYCLE MANAGEMENT

(71) Applicant: VMware, Inc., Palo Alto, CA (US)

(72) Inventor: Al Yaros, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 83 days.

(21) Appl. No.: 14/667,227

(22) Filed: Mar. 24, 2015

(65) Prior Publication Data

US 2016/0283222 A1 Sep. 29, 2016

(51) Int. Cl.
*G06F 9/44* (2018.01)
*G06F 8/38* (2018.01)
*G06F 8/34* (2018.01)

(52) U.S. Cl.
CPC . *G06F 8/38* (2013.01); *G06F 8/34* (2013.01)

(58) Field of Classification Search
CPC ........................................................ G06F 9/44
USPC .................................. 717/101–103, 120–127
See application file for complete search history.

(56) References Cited

U.S. PATENT DOCUMENTS

| | | | | |
|---|---|---|---|---|
| 5,911,076 A * | 6/1999 | Acker | ........................ | G06F 8/447 717/104 |
| 6,816,882 B1 * | 11/2004 | Conner | ................... | G06F 21/121 709/203 |
| 8,745,086 B2 * | 6/2014 | Cardno | .............. | G06F 17/30572 707/778 |
| 2004/0049488 A1 * | 3/2004 | Kenyon | ............. | G06F 17/30864 |
| 2008/0040670 A1 * | 2/2008 | Madhavarao | ......... | G06F 9/4443 715/733 |
| 2010/0208035 A1 * | 8/2010 | Pinault | ................ | G06K 9/00362 348/46 |

(Continued)

OTHER PUBLICATIONS

Daniel Magid, "Getting Started with Application Lifecycle Management", DZone Refcard #119, DZone, Inc., retrieved on Feb. 26, 2015 (3 pages).

(Continued)

*Primary Examiner* — Jae U Jeon
(74) *Attorney, Agent, or Firm* — Hanley, Flight & Zimmerman, LLC

(57) ABSTRACT

Example application user interface overlays for application lifecycle management are disclosed. Some example methods for application lifecycle management disclosed herein include activating a client to present an overlay over a user interface of an application, the overlay identifying an element of the user interface for which application lifecycle management data associated with the application is available for presentation. Such disclosed example methods also include presenting the application lifecycle management data in the overlay in response to detecting an input command while the overlay is active. Other example methods for application lifecycle management disclosed herein include obtaining application lifecycle management data associated with an element of a user interface of an application from a plurality of application lifecycle management data systems, and transmitting the application lifecycle management data to a client that is to include the application lifecycle management data in an overlay presented over the user interface of the application.

20 Claims, 12 Drawing Sheets

(56) References Cited

U.S. PATENT DOCUMENTS

| | | | | |
|---|---|---|---|---|
| 2013/0139130 A1* | 5/2013 | Anjan | ................ | G06F 11/3672 |
| | | | | 717/131 |
| 2013/0197947 A1* | 8/2013 | Carillo | .................. | G06Q 40/08 |
| | | | | 705/4 |
| 2013/0232185 A1* | 9/2013 | Armour | ............... | G06F 9/5072 |
| | | | | 709/203 |
| 2013/0268911 A1* | 10/2013 | Charfi | ..................... | G06F 8/10 |
| | | | | 717/105 |
| 2014/0279823 A1* | 9/2014 | Wang | ................... | G06Q 10/06 |
| | | | | 707/600 |
| 2015/0106152 A1* | 4/2015 | Basu | ................ | G06Q 10/0635 |
| | | | | 705/7.26 |
| 2015/0355888 A1* | 12/2015 | Shani | ...................... | G06F 8/33 |
| | | | | 717/113 |
| 2015/0370774 A1* | 12/2015 | Mason | .................... | G06F 8/70 |
| | | | | 715/224 |
| 2016/0055079 A1* | 2/2016 | Hanna | ............... | G06F 11/3692 |
| | | | | 717/135 |

OTHER PUBLICATIONS

Wikipedia, "Application lifecycle management", <http://en.wikipedia.org/w/index.php?title=Application_lifecycle_management&oldid=646638897>, last modified on Feb. 11, 2015 (3 pages).

Wikipedia, "Browser extension", <http://en.wikipedia.org/w/index.php?title=Browser_extension&oldid=646490778>, last modified on Feb. 10, 2015 (4 pages).

Susan Duncan, "Oracle Team Productivity Center Overview", An Oracle White Paper, Sep. 2011 (23 pages).

David Chappell, "What is Application Lifecycle Management?", Dec. 2008 (6 pages).

* cited by examiner

APPLICATION USER INTERFACE OVERLAYS FOR APPLICATION LIFECYCLE MANAGEMENT

FIELD OF THE DISCLOSURE

This disclosure relates generally to application lifecycle management and, more particularly, to application user interface overlays for application lifecycle management.

BACKGROUND

Application lifecycle management (ALM) systems are utilized by software providers, such as software manufacturers, software vendors, etc., to manage the product lifecycles of their application software. For example, different ALM systems are available for managing ALM entities tracking one or more aspects of an application's product lifecycle, such as ALM entities tracking different application feature requirements, tracking different software architecture development tasks, tracking different computer programming tasks, tracking different software testing activities, tracking different software maintenance tasks and/or defects, tracking different user story requirements, tracking different technical documentation versions, etc. The different ALM systems may employ different user interfaces, ALM data organization structures, etc., each involving a respective learning curve for the user. Furthermore, some software providers may employ multiple different ALM systems to meet their overall ALM goals.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
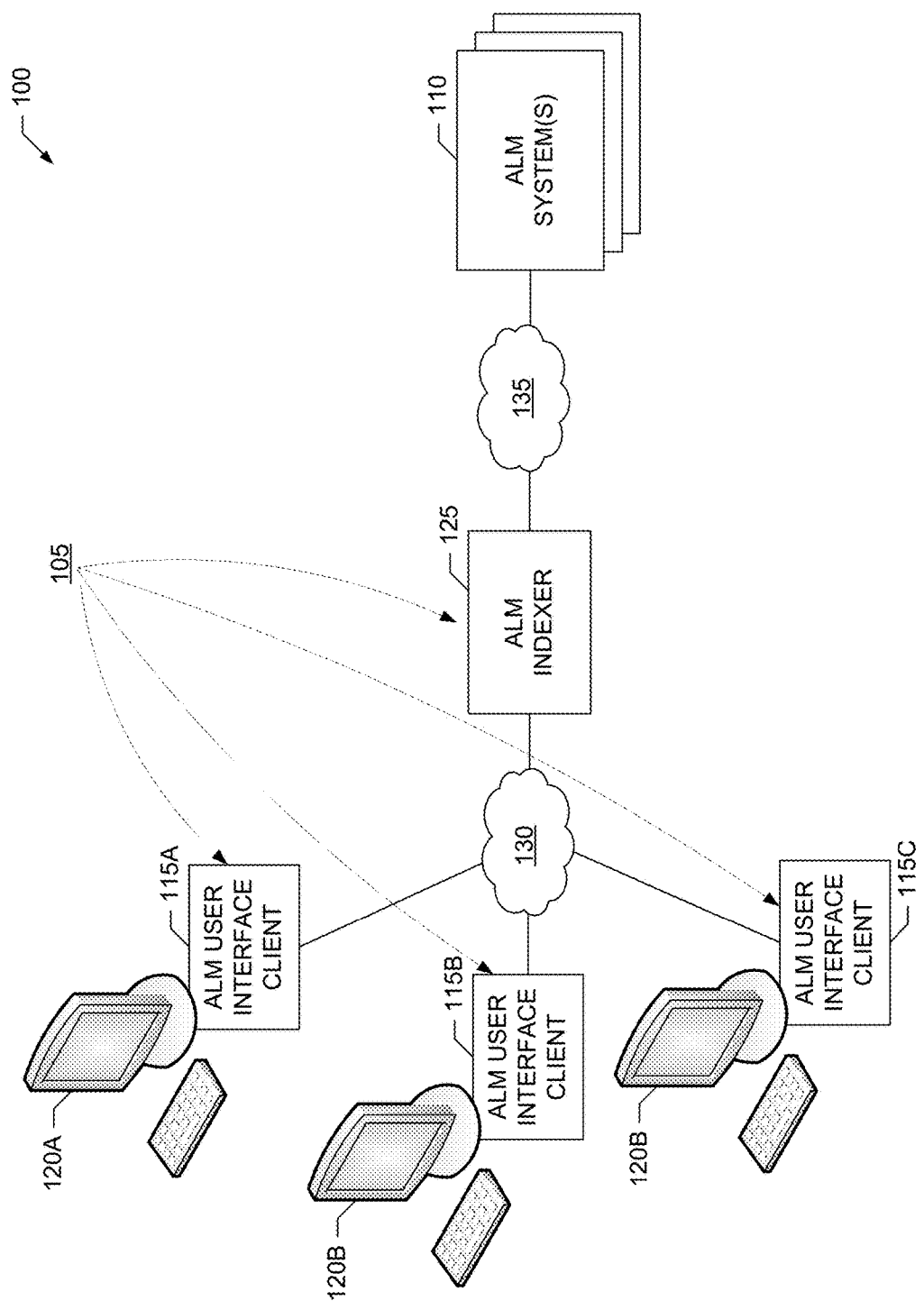
FIG. 1 is a block diagram of an example environment of use including an example application lifecycle management overlay system implemented in accordance with the teachings of this disclosure.

Application user interface overlays for application lifecycle management are disclosed herein. Example methods disclosed herein for application lifecycle management include activating a client to present an overlay over a user interface of an application. The overlay in such examples identifies a first element of the user interface for which first application lifecycle management data associated with the application is available for presentation. Some such disclosed example methods also include presenting the first application lifecycle management data in the overlay in response to detecting a first input command while the overlay is active.

In some such disclosed example methods, the overlay includes a graphical icon to identify the first element of the user interface for which the first application lifecycle management data is available. Furthermore, in some such disclosed example methods, detecting the first input command includes determining that a position of a mouse pointer corresponds to a region including the graphical icon.

Additionally or alternatively, some such disclosed example methods further include receiving the first application lifecycle management data from a server located remotely from the client.

Additionally or alternatively, in some such disclosed example methods, the first application lifecycle management data is a combination of application lifecycle management data obtained from several application lifecycle management systems.

Additionally or alternatively, some such disclosed example methods further include determining information identifying a second element of the user interface in response to detecting a second input command while the overlay is active, and associating the information with a plurality of application lifecycle management entities maintained by a plurality of application lifecycle management systems. In some examples, determining the information includes accessing a document object model associated with the user interface, and obtaining the information from XPATH data describing the second element in the document object model. In some examples, determining the information includes obtaining image data for an image depicting the second element of the user interface, and processing the image data to determine the information identifying the second element.

Additionally or alternatively, some such disclosed example methods further include receiving, from a server located remotely from the client, information identifying several elements of the user interface for which respective application lifecycle management data associated with the application is available for presentation. In some such examples, the several elements include the first element of the user interface and the respective application lifecycle management data includes the first application lifecycle management data.

Other example methods disclosed herein for application lifecycle management include obtaining first application lifecycle management data associated with a first element of a user interface of an application from a plurality of application lifecycle management data systems. Some such disclosed example methods also include transmitting the first application lifecycle management data to a client that is to include the first application lifecycle management data in an overlay presented over the user interface of the application.

In some such disclosed example methods, obtaining the application lifecycle management data includes accessing information identifying the first element of the user interface. For example, the information identifying the first element can be received from the client. Some such disclosed example methods also include searching the plurality of application lifecycle management data systems for application lifecycle management entities including the information. Some such disclosed example methods further include combining results of the searching to determine the first application lifecycle management data.

In some such disclosed example methods, the information identifying the first element includes XPATH data describing the first element of the user interface. Accordingly, in some such disclosed example methods, searching the application lifecycle management data systems includes searching the application lifecycle management data systems for application lifecycle management entities including the XPATH data describing the first element of the user interface In some such disclosed example methods, the information identifying the first element includes image data corresponding to the first element of the user interface. Accordingly, in some such disclosed example methods, searching the application lifecycle management data systems includes searching the application lifecycle management data systems for application lifecycle management entities including the image data corresponding to the first element of the user interface.

In some such disclosed example methods, the searching of the application lifecycle management data systems is performed autonomously in accordance with a schedule. Additionally or alternatively, in some such disclosed example methods, the searching of the application lifecycle management data systems is performed in response to a message from the client.

In some such disclosed example methods, the client is a first client, and the methods further include receiving information identifying the first element of the user interface from a second client different from the first client. Some such disclosed example methods also include transmitting the information to the first client for use in presenting the overlay over the user interface of the application.

These and other example methods, apparatus, systems and articles of manufacture (e.g., physical storage media) to implement application user interface overlays for application lifecycle management are disclosed in further detail below.

As mentioned above, today's software providers may employ multiple different ALM systems to meet their overall ALM goals. Each one of the different ALM systems may be responsible for tracking a different class (or subset of classes) of ALM entities corresponding to a different aspect (or subset of aspects) of an application's product lifecycle. For example, a first class of ALM entities may be associated with tracking different application feature requirements, a second class of ALM entities may be associated with tracking different software architecture development tasks, a third class of ALM entities may be associated with tracking different computer programming tasks, a fourth class of ALM entities may be associated with tracking different software testing activities, a fifth class of ALM entities may be associated with tracking different software maintenance tasks and/or defects, a sixth class of ALM entities may be associated with tracking different user story requirements, a seventh class of ALM entities may be associated with tracking different technical documentation versions, etc. Each one of the different ALM systems may utilize a different ALM data organization structure (e.g., a hierarchical tree structure) and/or a different user interface tailored to the particular class(es) of ALM entities the system is to manage. As such, each one of the different ALM systems may have a respective user learning curve. Therefore, to obtain a global perspective of a given feature of a software application at a particular point in its product lifecycle, application lifecycle management utilizing multiple ALM systems has required users to learn multiple different ALM systems, some of which may be outside the users' areas of expertise. Such an application lifecycle management approach can be inefficient and cumbersome to use.

Some software provider attempt to overcome the problems of utilizing multiple ALM systems by instead using a single ALM system to manage all of the classes of ALM entities tracking the different aspects of an application's product lifecycle. However, maintaining the hierarchical tree structures for each class of ALM entities, and the linkages between different classes of ALM entities, can become impractical for today's sophisticated application software.

Application user interface overlays for application lifecycle management, as disclosed herein, provide a different technical solution to the technical problems associated with utilizing multiple different ALM systems for managing a software application's product lifecycle. Disclosed example methods, apparatus, systems and articles of manufacture (e.g., physical storage media) to implement application user interface overlays for application lifecycle management utilize the user interface of the software application being managed as a navigation tool for obtaining a global perspective of the application's features during the product lifecycle of the application. Moreover, disclosed example methods, apparatus, systems and articles of manufacture (e.g., physical storage media) to implement application user interface overlays for application lifecycle management enable software providers to retain their multiple, different ALM systems, but provide a single focal point—an overlay presented over the user interface of the application itself—at which a user can gain access to different ALM data maintained in the different ALM systems for a particular feature. However, users need not become proficient in each of the different ALM systems to be able to access the available ALM data for the particular feature. Instead, application user interface overlays for application lifecycle management, as disclosed herein, utilize the users' existing knowledge of the user interface of the application being managed, along with additional functionality provided through an overlay presented over the application's user interface, to provide a user interface to access the ALM data from multiple, different ALM systems.

Some example ALM overlay systems disclosed herein include an example ALM system indexer and one or more example ALM overlay clients. In some examples, the ALM overlay clients execute on a user's computing device from which the user is also able to access a user interface of the software application being managed. For example, if the software application being managed is a web application, the ALM overlay client may be implemented as a browser extension of a web browser on the user's computing device. As disclosed in further detail below, the ALM overlay client is responsible for presenting an overlay over the user interface of the application, through which the user is able to access ALM data for an application feature associated with a selected user interface element, define additional user interface elements for which ALM data is to be accessible, etc.

In some examples, the ALM system indexer included in an example ALM overlay system is implemented by a server in communication with one or more ALM systems and accessible by one or more of the ALM overlay clients. As disclosed in further detail below, the ALM system indexer is responsible for searching the one or more ALM systems for ALM data associated with an application user interface element selected via the overlay presented by an ALM client, combining the retrieved ALM data and providing it to the ALM client for presentation via the overlay. In some examples, the ALM system indexer is also responsible for providing information to the ALM client to identify a group of application user interface element(s) having ALM data that may be accessed. In some examples, the ALM system indexer is able to update this group of user interface element(s) provided to one ALM overlay client based on information provided by other ALM overlay client(s). Furthermore, in some examples, the ALM system indexer is responsible for updating ALM entities in the ALM systems with information identifying the application user interface elements to be associated with those ALM entities. These and other capabilities of example ALM overlay clients and example ALM system indexers included in example ALM overlay systems are disclosed in further detail below.

Turning to the figures, a block diagram of an example environment of use 100 including an example ALM overlay system 105 implemented in accordance with the teachings of this disclosure is illustrated in FIG. 1. The ALM overlay system 105 of the illustrated example utilizes the user interface of a software application being managed by one or more example ALM systems 110 to access the ALM data maintained by the ALM system(s) 110 for the software application. In the example environment of use 100 of FIG. 1, the ALM system(s) 110 are is(are) implemented by any number and/or type(s) of ALM system(s) capable of tracking ALM entities managing aspects of the application's product lifecycle. For example, different ALM system(s) 110 may be included in the example environment of use 100 to track different classes (or subsets of classes) of ALM entities corresponding to different aspects (or subsets of aspects) of an application's product lifecycle. The different classes of ALM entities capable of being tracked by the example ALM system(s) 110 include, but are not limited to, a first class of ALM entities associated with tracking different application feature requirements, a second class of ALM entities associated with tracking different software architecture development tasks, a third class of ALM entities associated with tracking different computer programming tasks, a fourth class of ALM entities associated with tracking different software testing activities, a fifth class of ALM entities associated with tracking different software maintenance tasks and/or defects, a sixth class of ALM entities associated with tracking different user story requirements, a seventh class of ALM entities associated with tracking different technical documentation versions, etc. As such, the example ALM system(s) 110 may include, but is(are) not limited to one or more of Hewlett Packard's® Quality Center system, Microsoft's® Team Foundation Server, Atlassian's® JIRA project and issue tracking system, Rally Software's® project management system, Bugzilla-based systems, wiki-based document management systems, etc.

In the illustrated example environment of use 100, the ALM entities tracked by the different ALM systems 110 can correspond to any type of data record, data entry, data file, data set, etc., capable of storing data related to a particular product aspect being managed by a particular one of ALM entities. As such, because the format of their respective ALM entities may be different, the different ALM systems 110 of the illustrated example may utilize different ALM data organization structures (e.g., different hierarchical tree structures) for managing and tracking their respective ALM entities. Additionally or alternatively, the different ALM systems 110 in the example environment of use 100 may have different user interfaces tailored to the particular class(es) of ALM entities the different ALM systems 110 are to manage. As such, in the example environment of use 100, each one of the different ALM systems 110 may have a respective user learning curve. Therefore, requiring users to access the different ALM systems 110 directly to obtain a global perspective of a given feature of a software application at a particular point in its product lifecycle may be inefficient and cumbersome as the different ALM systems 110 each will have its own learning curve, some of which may be outside the users' areas of expertise.

Unlike prior environments of use that rely on users to access ALM data directly from multiple ALM systems, the example environment of use 100 includes the example ALM overlay system 105 to provide a single navigation tool for accessing ALM data from the ALM system(s) 110 to obtain a global perspective of a software application's features during the product lifecycle of the application. More specifically, the ALM overlay system 105 utilizes the user interface of the managed software application itself to provide the navigation tool for accessing ALM data concerning the application's features from the ALM system(s) 110.

For example, the ALM overlay system 105 of FIG. 1 includes example ALM overlay clients 115A-C to implement overlays that are presented over the user interface of the software application for which ALM data is to be accessed. As shown in the illustrated example, the ALM overlay clients 115A-C are executed on, implemented by and/or otherwise associated with respective example computing devices 120A-C from which users (e.g., research and development engineers, software architects, software developers, software testers, document writers, project managers, etc.) are able to access the user interface of the software application being managed by the ALM system(s) 110 and for which ALM data is to be accessed. In some examples, the software application being managed is a web application, and one or more of the computing devices 120A-C execute web browsers from which the user interface of the application can be accessed. In some such examples, the ALM overlay client(s) 115A-C corresponding to these computing device(s) 120A-C may be implemented as browser extensions executable by the web browsers operating on the computing device(s) 120A-C. In some examples, the software application being managed is a stand-alone application executed on, implemented by and/or otherwise associated with one or more of the example computing devices 120A-C. In some such examples, the ALM overlay client(s) 115A-C corresponding to these computing device(s) 120A-C may be implemented as thin clients that intercept and operate on the user interface data (e.g., graphical data, textual data, etc.) output by the software application being managed. The example computing device(s) 120A-C can include any number and/or type(s) of computing devices, such as, but not limited to, personal computers, portable computing devices (e.g., laptop/notebook computers, smart phones, tablet computers, etc.), etc., and/or any combination(s) thereof.

Figure 4:
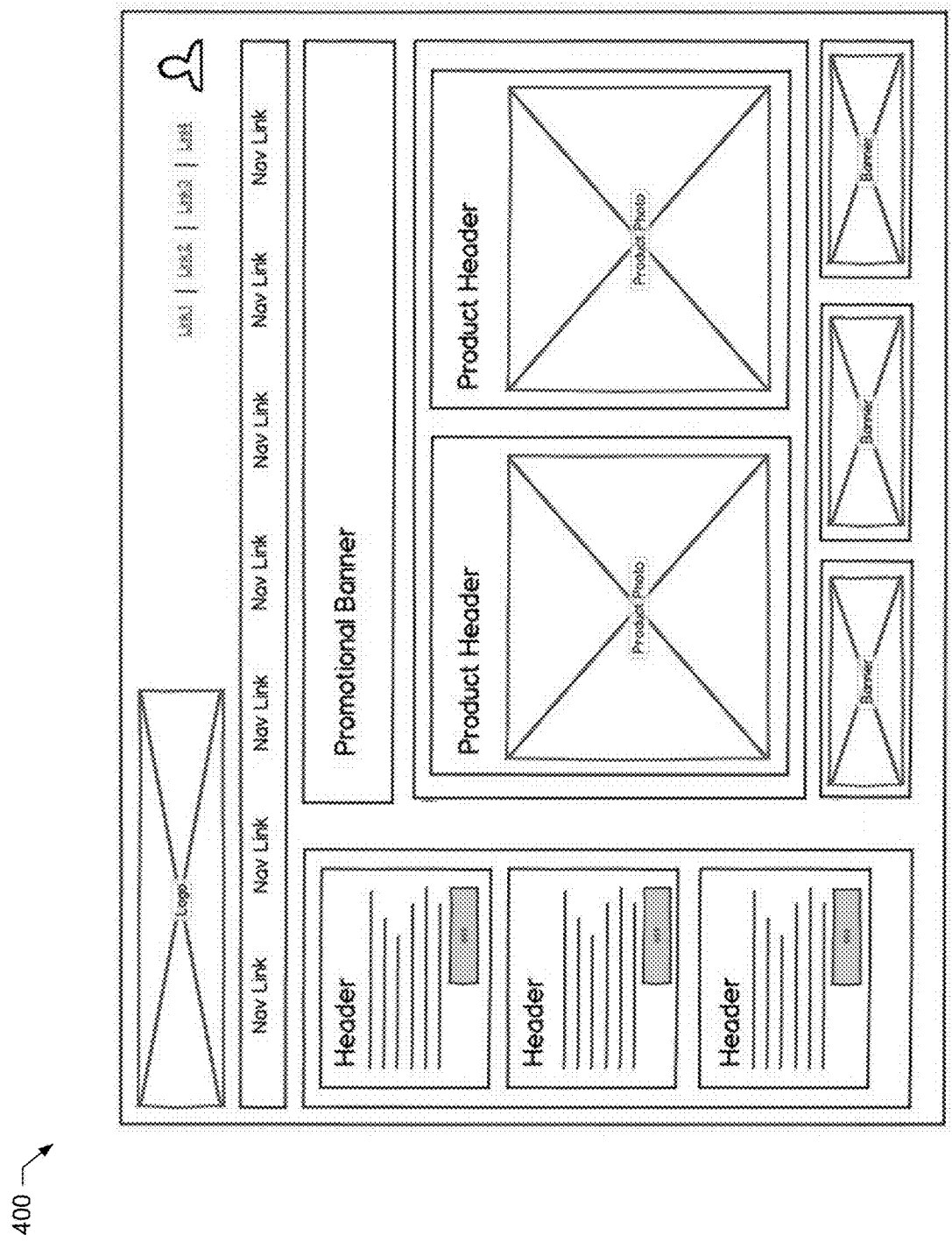
FIGS. 4-6 collectively illustrate an example application lifecycle management overlay that may be implemented by the example application lifecycle management overlay system of FIG. 1.
Figure 5:
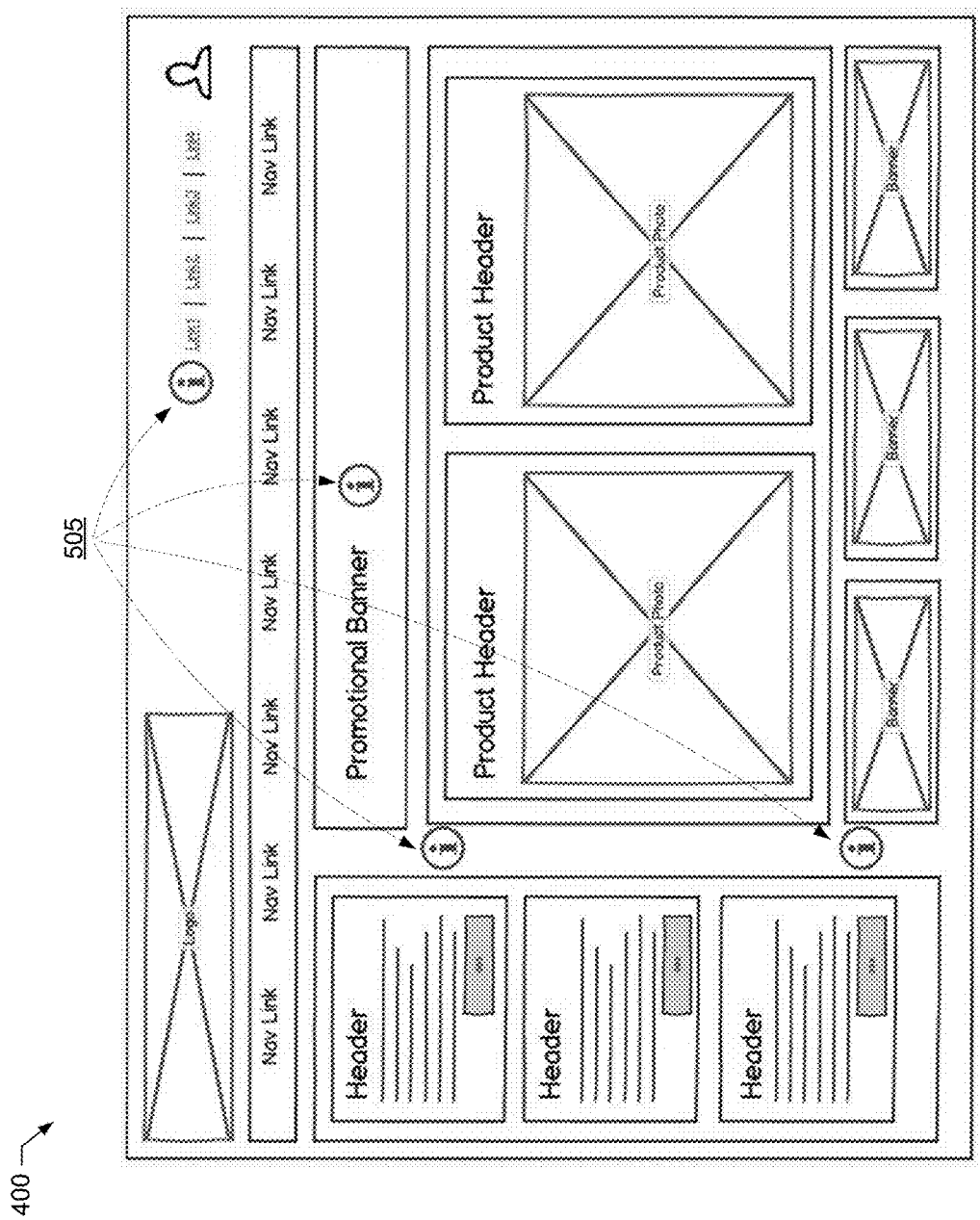
Figure 6:
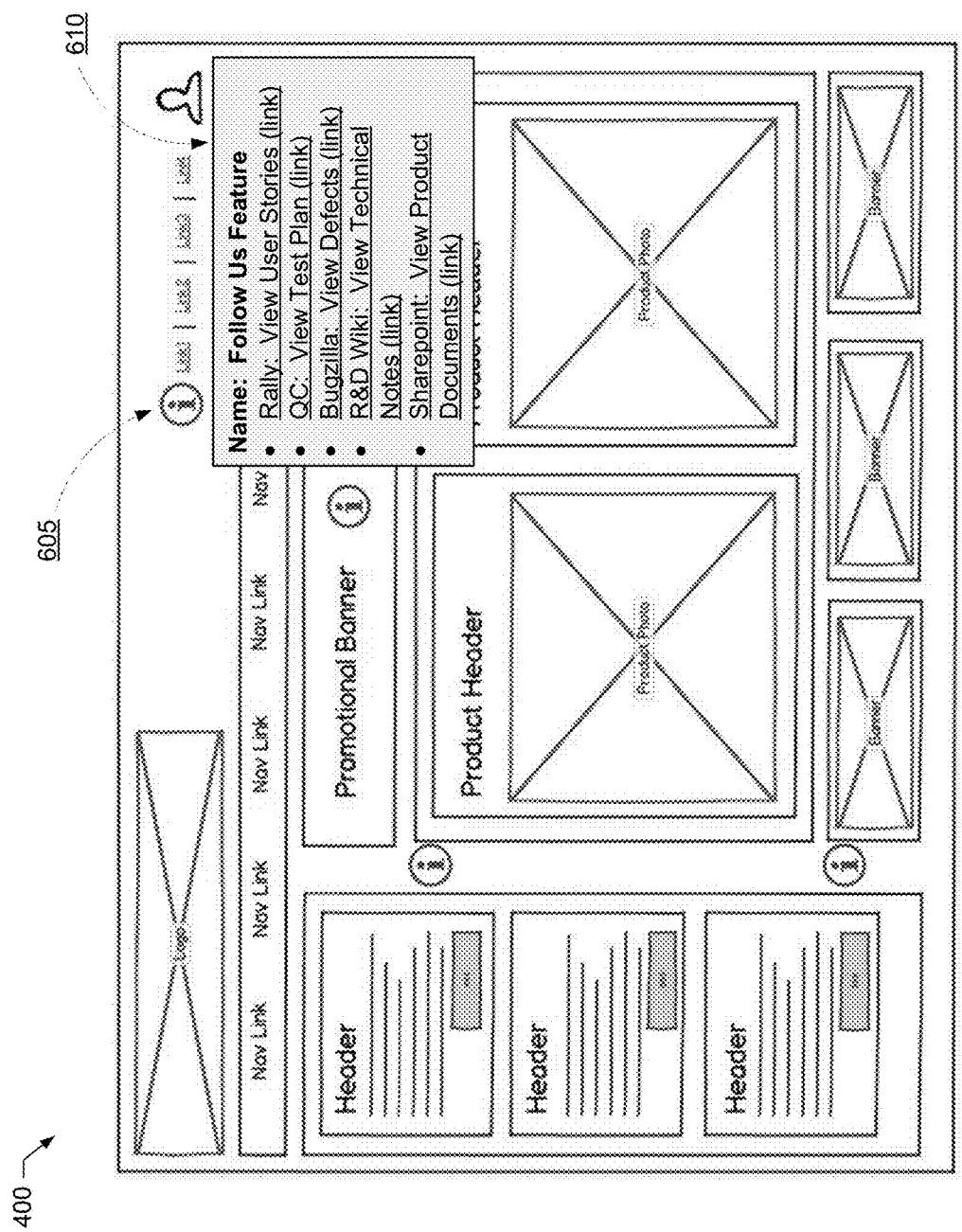

As described in further detail below, respective ones of the ALM overlay client(s) 115A-C present overlays over the user interface of a software application being managed to permit ALM data for features of the software application to be presented to users of the respective computing device(s) 120A-C. For example, the ALM overlay client 115A presents an overlay over the user interface presented by the computing device 120A for a managed software application. In the illustrated example of FIG. 1, the overlay presented by the ALM overlay client 115A identifies (e.g., via graphical icons, textual information, color/highlighting, etc.) one or more elements of the managed application's user interface for which respective ALM data associated with the application is available for presentation. Furthermore, in the illustrated example of FIG. 1, the ALM overlay client 115A presents the particular ALM data for a particular one of the user interface elements (e.g., in a pop-up window, in a preview screen, etc.) in response to detecting an appropriate input command selecting the particular user interface element while the overlay is active. For example, the ALM overlay client 115A may present first ALM data for a first user interface element in an overlay over the application's user interface in response to a user selecting the first user interface element via the overlay (e.g., by hovering a mouse pointer over the first interface element, by clicking a mouse on the first interface element, etc.). An example overlay that may be implemented by the ALM overlay client 115A-C is illustrated in FIGS. 4-6, which are described in further detail below.

In some examples, the ALM overlay client 115A permits the user to identify additional user interface elements to add to the group of interface elements for which ALM data is to be accessible via the overlay. In some examples, the ALM overlay client 115A permits additional user interface elements to be identified from information (e.g., such as a document object model, etc.) used to generate the application's user interface. Additionally or alternatively in some examples, the ALM overlay client 115A permits additional user interface elements to be identified graphically by the user. Further details concerning the ALM overlay clients 115A-C are disclosed below in connection with FIG. 2, which illustrates an example ALM overlay client 115 that may be used to implement one or more of the example ALM overlay clients 115A-C of FIG. 1.

The example ALM overlay system 105 of FIG. 1 includes an example ALM system indexer 125 to provide ALM data to the example ALM clients 115A-C for presentation in their respective user interface overlays. In the illustrated example of FIG. 1, the ALM system indexer 125 is in communication with and accessible by the ALM clients 115A-C via an example network 130, and the indexer 125 is in communication with and able to access the ALM system(s) 110 via an example network 135. The example networks 130 and 135 may be implemented by any number and/or type(s) of communication networks, such as one or more wired communication networks (e.g., broadband networks, public telephony networks, etc.), one or more wireless communication networks (e.g., mobile cellular networks, wireless local area networks, etc.), etc., and/or any combination thereof. Moreover, the example networks 130 and 135 may be implemented by the same communication network(s) or by different communication networks.

As used herein, the phrase "in communication," including variants thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In the illustrated example of FIG. 1, the ALM system indexer 125 maintains information identifying the group of user interface elements, of the software application being managed, for which ALM data is to be accessible via the overlays presented by the ALM clients 115A-C. For example, the ALM system indexer 125 may be initialized with the group of user interface elements and/or may learn which user interface elements to include in the group through information provided by users of the overlays presented by the ALM clients 115A-C. As such, in some examples, the ALM system indexer 125 is responsible for maintaining information identifying the user interface elements for which ALM data is to be accessible via overlays presented the ALM clients 115A-C, and for providing/updating this information to the ALM clients 115A-C to facilitate generation of the overlays. As disclosed in further detail below, the example ALM system indexer 125 also searches the ALM system(s) 110 for ALM data associated with the user interface elements supported by the overlays presented by the ALM clients 115A-C. In some examples, the ALM system indexer 125 combines the ALM data received from the different ALM system(s) 110 for a particular user interface element and provides the combined ALM data to the ALM clients 115A-C for presentation via their respective overlays.

For example, the ALM system indexer 125 of FIG. 1 may obtain first ALM data associated with a first element of a user interface of a managed software application by searching different ALM systems 110 for ALM entries containing information identifying the first user interface element, and then combining the individual ALM data retrieved from the different ALM systems 110 for the first user interface element. The ALM system indexer 125 then transmits this first ALM data to, for example, the ALM overlay client 115A for inclusion in an overlay to be presented by the ALM overlay client 115A over the user interface of the managed software application. In some examples, the ALM system indexer 125 searches the ALM system(s) 110 to obtain ALM data for the group of user interface elements to be supported by the ALM overlays autonomously according to a schedule, and then provides the respective data for a particular user interface element to a requesting one of the ALM overlay clients 115A-C in response to a request identifying the particular user interface element. Additionally or alternatively, in some examples, the ALM system indexer 125 searches the ALM system(s) 110 to obtain ALM data for a particular user interface element in response to a request identifying the particular user interface element, and then provides the ALM data to the requesting one of the ALM overlay clients 115A-C. In some examples, the information identifying the user interface elements to be managed by the ALM system indexer 125 is obtained from information (e.g., such as a document object model, etc.) used to generate the application's user interface. Additionally or alternatively in some examples, the ALM overlay client 115A the information identifying the user interface elements to be managed by the ALM system indexer 125 is graphical data representing the user interface elements. Further details concerning the example ALM system indexer 125 are disclosed below in connection with FIG. 3, which illustrates an example implementation of the ALM system indexer 125 of FIG. 1.

Although the example ALM overlay system 105 illustrated in FIG. 1 includes three example ALM overlay clients 115A-C and one example ALM system indexer 125, the example ALM overlay system 105 is not limited thereto. On the contrary, the example ALM overlay system 105 may include any number of example ALM overlay clients 115A-C in communication with any number of ALM system indexers 125.

Figure 2:
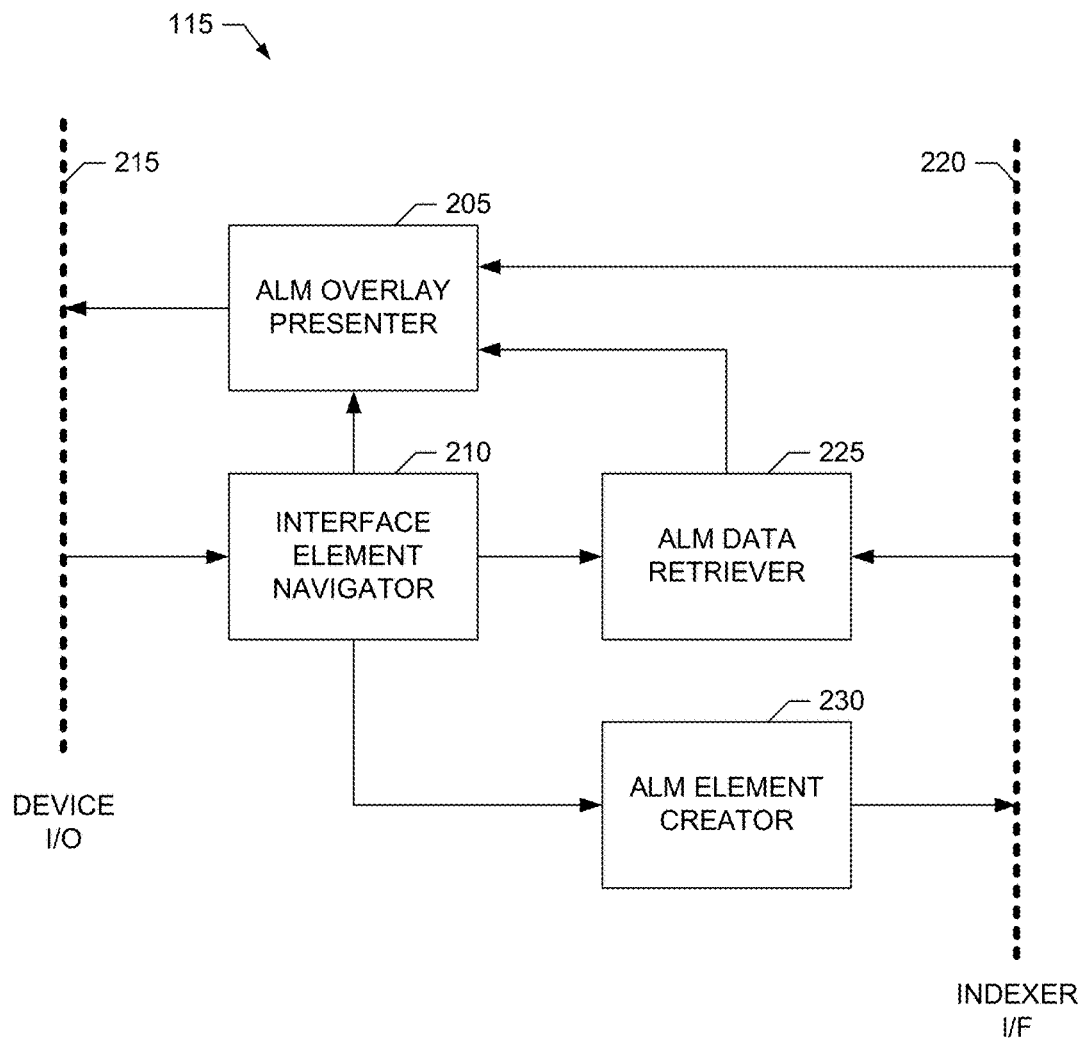
FIG. 2 is a block diagram of an example application lifecycle management overlay client that may be used to implement the example application lifecycle management overlay system of FIG. 1.

A block diagram of an example ALM overlay client 115 that may be used to implement one or more of the example ALM overlay clients 115A-C of FIG. 1 is illustrated in FIG. 2. As noted above, the ALM overlay client 115 of the illustrated example facilitates efficient access to ALM data maintained for a software application by one or more ALM systems 110 through use the user interface of the software application itself as a navigation tool for accessing the ALM data. More specifically, the example ALM overlay client 115 implements an overlay over the application's user interface via which a user can access ALM data associated with a particular user interface element, identify additional interface elements for which ALM data is to be accessible, etc.

For example, the ALM overlay client 115 of FIG. 2 includes an example ALM overlay presenter 205 to present an overlay over the user interface of the software application being managed by the example ALM system(s) 110. In the illustrated example of FIG. 2, the ALM overlay presenter 205 presents an overlay that identifies user interface elements for which ALM data is available for presentation. As an illustrative example, an example overlay implemented by the ALM overlay presenter 205 for a particular software application is illustrated in FIGS. 4-6.

FIGS. 4-6 illustrate an example user interface 400 for a software application for which the example ALM overlay presenter 205 is to implement an ALM overlay. The software application depicted in the example of FIGS. 4-6 corresponds to a web application, but in other examples, the software application could be a stand-alone application resident on a computing device such as one or more of the example computing devices 120A-C, a cloud-based application accessible by one or more of the example computing devices 120A-C, etc. In the illustrated example of FIGS. 4-6, when the example ALM overlay client 115 is activated, the example ALM overlay presenter 205 presents an example overlay that includes example element identifiers 505 (see FIG. 5) to identify the user interface element(s) for which ALM data is available for presentation. For example, the element identifiers 505 can be implemented by any number and/or type(s) of graphical icons (e.g., such as a letter 'i' within a shaded circle, as shown in the example of FIG. 5), textual information, color/highlighting, etc.

In some examples in which the user interface for a given software application is static, the ALM overlay presenter 205 presents one overlay for the software application. In some examples in which the user interface for a given software application is dynamic (e.g., such as a user interface that changes based on prior selections made by a user, and/or a user interface implemented by multiple screens that are selectable by a user, etc.), as in the case of a web application, the ALM overlay presenter 205 presents different overlays for the software application, which are tailored to a current state of the user interface.

To access ALM data associated with a particular user interface element, a user navigates to the particular user interface element depicted in the overlay presented by the ALM overlay presenter 205. To detect such user navigation, the example ALM overlay client 115 of FIG. 2 includes an example interface element navigator 210. The interface element navigator 210 of the illustrated example detects input commands that occur while the ALM overlay presented by the ALM overlay presenter 205 is active. For example, the interface element navigator 210 detects display element commands, which instruct the ALM overlay presenter 205 to present ALM data for a selected user interface element. In some examples, the interface element navigator 210 detects a display element command when the interface element navigator 210 determines that a mouse pointer has been positioned to hover over a particular interface element while the overlay is active and presenting an element identifier 505 for the particular interface element indicating that ALM data is available. In some examples, the interface element navigator 210 detects a display element command when the interface element navigator 210 determines that a mouse click (e.g., a left mouse click) has occurred when the mouse pointer has been positioned over a particular interface element while the overlay is active and presenting an element identifier 505 for the particular interface element indicating that ALM data is available. In some examples, the interface element navigator 210 detects a display element command when the interface element navigator 210 detects that the element identifier 505 for a particular interface element has been selected (e.g., by positioning a mouse pointer over a display region including the element identifier 505, by clicking on the element identifier 505, etc.) while the overlay is active. In some examples, the interface element navigator 210 detects a display element command entered when a corresponding user input command, menu option, key press, etc., supported by the overlay is detected. Other techniques for implementing a display element command are contemplated in the context of this disclosure.

For example, with reference to the example overlay of FIGS. 4-6, the interface element navigator 210 detects a display element command associated with an example element identifier 605 (see FIG. 6) when, for example, a mouse pointer is positioned in a region including the element identifier 605. Then, in response to detecting the display element command associated with the element identifier 605, the interface element navigator 210 instructs the example ALM overlay presenter 205 to present ALM data associated with the selected user interface element (or associated with application features corresponding to the selected user interface element). For example, the ALM overlay presenter 205 may cause an example ALM data window 610 (see FIG. 6) to be presented as a pop-up window in a region near the selected element identifier 605. Additionally or alternatively, the ALM overlay presenter 205 may present ALM data associated with the selected element identifier 605 in a separate preview screen, etc. In the illustrated example of FIGS. 4-6, the ALM data window 610 presented by the example ALM overlay presenter 205 includes ALM data combined from multiple ALM systems 110 managing ALM entities associated with the selected user interface element. By way of example, which is not meant to be limiting, the ALM data presented in the example ALM data window 610 of FIG. 6 includes ALM entities tracking user requirements (e.g., user stories), test plans, bug/defects, technical notes, technical documentation, etc.

To permit the example ALM overlay presenter 205 to present overlay data over the user interface (e.g., such as the element identifiers 505, 605 and/or the ALM data windows 610, etc.) and to permit the example interface element navigator 210 to detect user input data/commands (e.g., such as interface element selections, mouse pointer positions/selections, etc.), the example ALM overlay client 115 of FIG. 2 includes an example device input/output (I/O) interface 215. The device I/O interface 215 of the illustrated example can be implemented by one or more operating system (I/O) libraries, function calls, etc., capable of writing data to and/or reading data from input devices and/or output devices of a computing device, such as the example computing devices 120A-C. Additionally or alternatively, the device I/O interface 215 can be implemented by any one or more I/O interfaces, such as the example interface 1120 included in the example processing system 1100, which is described in further detail below.

In the illustrated example of FIG. 2, the ALM overlay client 115 receives user interface element identification information, which is to be used by the ALM overlay presenter 205 to present an ALM overlay, from an ALM system indexer, such as the example ALM system indexer 125. The example ALM overlay client 115 of FIG. 2 also receives the ALM data to be presented by the ALM overlay presenter 205 in the ALM overlay from an ALM system indexer, such as the example ALM system indexer 125. Accordingly, the example ALM overlay client 115 of FIG. 2 includes an example indexer interface 220 to interface with the example ALM system indexer 125. For example, the indexer interface 220 can be implemented by any number and/or type(s) of communication interface(s) capable of communicating with the ALM system indexer 125 via the example network 130. In some examples, the indexer interface 220 can be implemented by an interface such as the example interface 1120 included in the example processing system 1100, which is described in further detail below.

As noted above, in the illustrated example of FIG. 2, the ALM overlay presenter 205 receives information identifying the user interface element(s) for which ALM data is available for presentation from, for example, the ALM system indexer 125 via the indexer interface 220. The ALM overlay presenter 205 uses the received interface element identification information to, for example, generate the element identifiers 505, 605 and/or determine where the element identifiers 505, 605 are to be positioned in the ALM overlay, etc. The interface element identification information received from the ALM system indexer 125 via the indexer interface 220 can take one or more forms. In some examples, the interface element identification information corresponds to information used by the software application itself to identify and include the interface elements in its user interface. For example, the information identifying the user interface element(s) for which ALM data is available can be XPATH data that identifies those user interface element(s) in a document object model (DOM) used by the software application to generate its user interface. In such examples, the ALM overlay presenter 205 uses the XPATH data provided by the ALM system indexer 125 for the identified user interface elements to locate the interface elements in the application's DOM and then presents the element identifiers 505, 605 in the ALM overlay in accordance with (e.g., near) how the DOM specifies that the corresponding interface elements are to be presented in the application's user interface.

Additionally or alternatively, the information identifying the user interface element(s) for which ALM data is available can be image data representing those user interface element(s). In such examples, the ALM overlay presenter 205 uses the image data provided by the ALM system indexer 125 for the identified user interface elements to search for (e.g., using image search techniques based on the scale invariant feature transform, or SIFT, and/or any other technique) and locate those interface elements on the application's user interface. The ALM overlay presenter 205 then presents the identifiers 505, 605 in the ALM overlay in accordance with (e.g., near) where the image search(es) yielded successful match(es).

In some examples, the interface element identification information provided by the ALM system indexer 125 via the indexer interface 220 is initialized in the ALM system indexer 125. Additionally or alternatively, in some examples, the interface element identification information provided by the ALM system indexer 125 via the indexer interface 220 is updated over time based on element identification information provided by the ALM overlay client 115 (and/or other ALM overlay clients) to the ALM system indexer 125 via the indexer interface 220, as described in further detail below.

As noted above, in the illustrated example of FIG. 2, the ALM overlay presenter 205 receives ALM data associated with a selected user interface element from, for example, the ALM system indexer 125 via the indexer interface 220. Accordingly, the example ALM overlay client 115 of FIG. 2 includes an example ALM data retriever 225 to receive the ALM data from the remotely located ALM system indexer 125 via the indexer interface 220. In some examples, the ALM data received by the ALM data retriever 225 for presentation in the ALM data window 610 for a selected user interface element is a combination of ALM data maintained by and obtained from multiple ALM systems, such as the example ALM system(s) 110. In the illustrated example, the ALM data retriever 225 queries the remote ALM system indexer 125 for ALM data associated with a selected user interface element identified by the interface element navigator 210 in response to detecting a display element command. In some examples, the interface element navigator 210 identifies the selected interface element using the same information (e.g., XPATH data, image data, etc.) used by the ALM overlay presenter 205 to identify the user interface element. Then, in response to the query, the ALM data retriever 225 receives the requested ALM data from the ALM system indexer 125 and provides the ALM data to the ALM overlay presenter 205 for presentation in an ALM data window 610 associated with the selected user interface element.

The example ALM overlay client 115 of FIG. 2 further includes an example ALM element creator 230 to allow a user to identify additional user interface elements for which ALM data is to be presented in the ALM overlay presented by the ALM overlay presenter 205. In the illustrated example, the ALM element creator 230 is invoked by the interface element navigator 210 in response to detecting a create element command, which instructs the ALM overlay client 115 to add a selected user interface element to the group of interface elements for which ALM data is able to be presented in the ALM overlay. In some examples, the interface element navigator 210 detects a create element command when the interface element navigator 210 determines that a special mouse click (e.g., a right mouse click) has occurred while the overlay is active. Additionally or alternatively, in some examples, the interface element navigator 210 detects a create element command when the interface element navigator 210 determines that a corresponding user input command, menu option, key press, etc., supported by the overlay is detected.

In response to detecting a create element command, the interface element navigator 210 invokes the ALM element creator 230 to determine information identifying a user interface element in a location of the user interface corresponding to the create element command (e.g., which may correspond to a location of a mouse pointer when the create element command was detected, etc.). In some examples, the ALM element creator 230 selects the user interface element that is to be the subject of the create element command to be the closest user interface element in the vicinity of the create element command's location for which ALM data is not already accessible via the overlay. Then, in some examples, the ALM element creator 230 identifies this selected user interface element, which is to be supported by the ALM overlay, using information that is also used by the software application itself to identify and include the interface element in its user interface. For example, the ALM element creator 230 may search a DOM, which is used by the software application to generate the application's user interface, for XPATH data identifying a user interface element at the location of the create element command. The ALM element creator 230 in such examples then processes (e.g., extracts) the XPATH data from the DOM and uses it to identify the new user interface element that is to be supported by the ALM overlay.

Additionally or alternatively, in some examples, the ALM element creator 230 identifies this selected user interface element, which is to be supported by the ALM overlay, using image data representing the selected interface element that is the subject of the create element command. For example, the ALM element creator 230 may present a graphical interface via which a user may identify the new user interface element to be supported by the ALM overlay graphically (e.g., by drawing a rectangle, polygon, circle, etc., around the user interface element of interest). The ALM element creator 230 in such examples then determines image data (e.g., by taking a screenshot) representing the selected region of the user interface. In some examples, the ALM element creator 230 uses the image data as the identification information for the selected user interface element. In some examples, the ALM element creator 230 further processes the image data to determine vector data, binary data, descriptors, etc., that is(are) to be the identification information for the selected user interface element.

In some examples, the ALM element creator 230 further presents a window, screen, etc., via which the user is able to enter the ALM entity or entities for which ALM data is to be presented (e.g., user requirements (e.g., user stories), test plans, bug/defects, technical notes, technical documentation, etc.), and/or identify the ALM system(s) 110 tracking the ALM entities associated with the new user interface element to be supported by the ALM overlay. In some such examples, the ALM element creator 230 transmits the identification information for this new user interface element, along with any other ALM entity data entered by the user, to the ALM system indexer 125 via the example indexer interface 220. The ALM system indexer 125, in turn, stores the user interface element identification information (e.g., XPATH data, image data, etc.) in the appropriate ALM system(s) with the ALM data (e.g., data records, data entries, data files, etc.) for the ALM entity or entities to be associated with the user interface element.

In some examples, the user manually accesses the respective ALM system(s) 110 tracking the ALM entity or entities associated with the new user interface element to be supported by the ALM overlay. In such examples, the user manually adds the user interface element identification information (e.g., XPATH data, image data, etc.) to the ALM data (e.g., data records, data entries, data files, etc.) for the ALM entity or entities to be associated with the user interface element. In either case, once the identification information identifying the user interface element is added to the proper ALM entity or entities in the appropriate ALM system(s) 110, the ALM system indexer 125 is able to search the ALM system(s) 110 based on the user interface element identification information to identify the ALM entity or entities associated with a given user interface element, and combine the retrieved ALM data for the identified ALM entity or entities for reporting to the ALM client 115.

Figure 3:
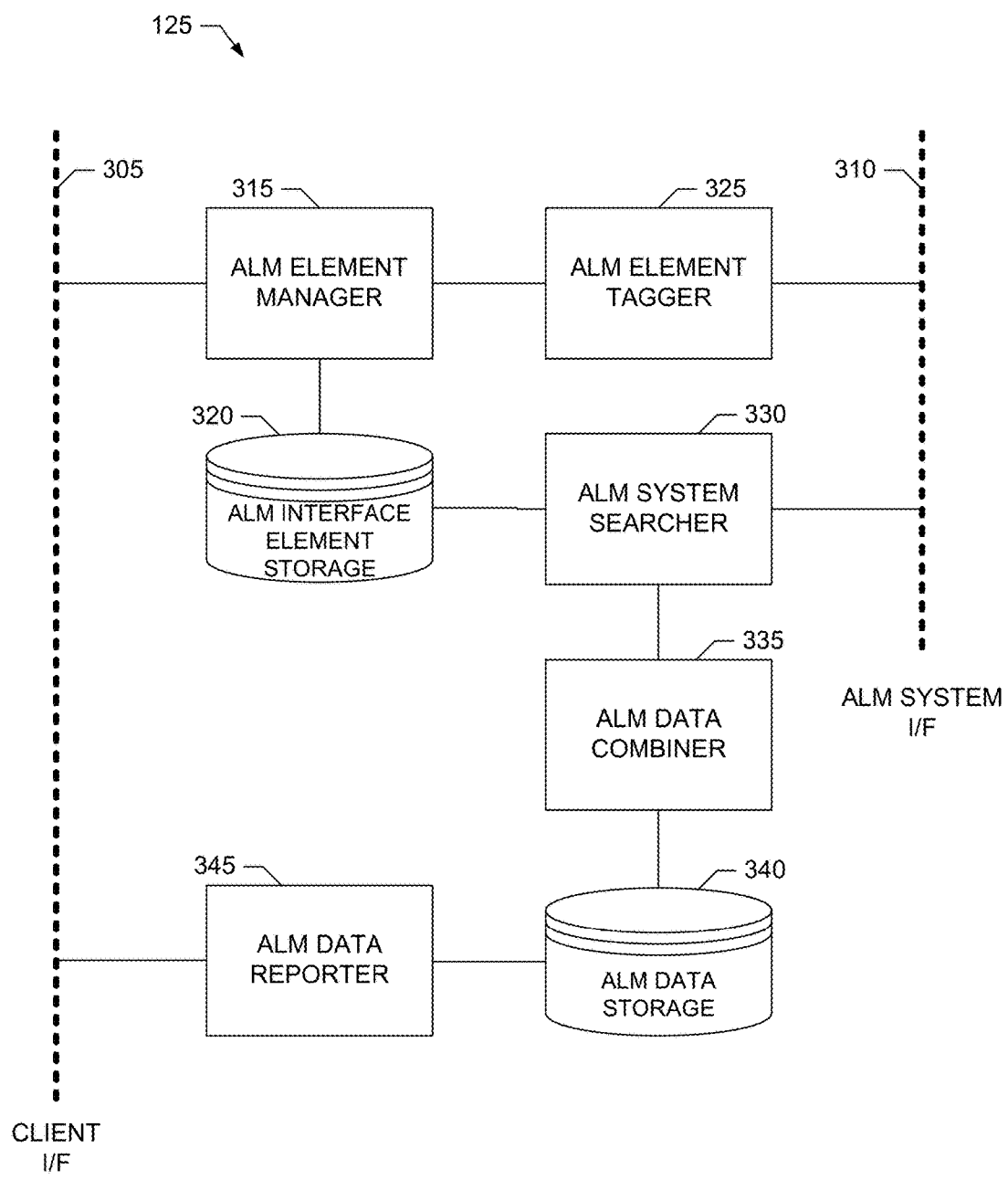
FIG. 3 is a block diagram of an example application lifecycle management system indexer that may be used to implement the example application lifecycle management overlay system of FIG. 1.

A block diagram of an example implementation of the ALM system indexer 125 of FIG. 1 is illustrated in FIG. 3. The example ALM system indexer 125 of FIG. 3 includes an example client interface 305 to interface with ALM overlay clients, such as the example ALM overlay clients 115A-C of FIG. 1 and/or the example ALM overlay client 115 of FIG. 2. The example ALM system indexer 125 of FIG. 3 also includes an example ALM system interface 310 to interface with one or more ALM systems, such as the example ALM system(s) 110 of FIG. 1. The example client interface 305 and/or the example ALM system interface 310 can be implemented by any number and/or type(s) of communication interface(s) capable of communicating with, for example, the example network 130 and/or the example network 135. In some examples, the example client interface 305 and/or the example ALM system interface 310 can be implemented by an interface such as the example interface 1220 included in the example processing system 1200, which is described in further detail below. Also, in some examples, the example client interface 305 and the example ALM system interface 310 may be implemented by the same communication interface, whereas in other examples the example client interface 305 and the example ALM system interface 310 may be implemented by different communication interfaces.

The example ALM system indexer 125 of FIG. 3 further includes an example ALM element manager 315 to maintain information identifying the user interface element(s) to be supported by an ALM overlay for a given software application. As described above, such interface element identification information may correspond to information also used by the software application itself to identify and include the interface elements in its user interface. For example, such identification maintained by the ALM element manager 315 to identify user interface element(s) for which ALM data is accessible via an ALM overlay may include XPATH data that identifies those user interface element(s) in a DOM used by the software application to generate its user interface. Additionally or alternatively, the information identifying the user interface element(s) for which ALM data is available via an ALM overlay can be image data representing those user interface element(s).

In the illustrated example of FIG. 3, the ALM system indexer 125 includes example ALM interface element storage 320 to store the interface element identification information maintained by the ALM element manager 315. The ALM interface element storage 320 may be implemented by any number, type(s) and/or combination of data storage elements, memories, etc., such as the example memory 1214 and/or the example storage device(s) 1228 of the example processing system 1200 of FIG. 12, which is described in further detail below. In some examples, the ALM element manager 315 retrieves the interface element identification information from the ALM interface element storage 320 and transmits the information via the example client interface 305 to one or more of the ALM overlay clients 115 and/or 115A-C to enable the client to generate an ALM overlay to be presented over the user interface of the software application being managed, as described above.

In some examples, the interface element identification information by the ALM element manager 315 is initialized in the ALM interface element storage 320. In some examples, the ALM element manager 315 receives updated interface element identification information, as described above, from one or more of the ALM overlay clients 115 and/or 115A-C via the example client interface 305 (e.g., as determined and reported by their respective ALM element creators 230). In such examples, the ALM system indexer 125 of FIG. 3 may include an example ALM element tagger 325 to store the information identifying a user interface element, which is received from one or more of the ALM overlay clients 115 and/or 115A-C via the example client interface 305, in the appropriate ALM system(s) 110 with the ALM data (e.g., data records, data entries, data files, etc.) for the ALM entity or entities to be associated with the user interface element. For example, the ALM element tagger 325 can be configured with the appropriate credentials to access one or more the ALM system(s) 110 via dynamic link libraries, command line interfaces, etc., to access the ALM entities tracked by the ALM system(s) 110, and then include information (e.g., XPATH data, image data/descriptors, etc.) identifying user interface elements to the ALM data for the ALM entities to be associated with those user interface elements.

The example ALM system indexer 125 of FIG. 3 includes an example ALM system searcher 330 to search the ALM system(s) 110 accessible via the example ALM system interface 310 for ALM entries associated with respective application user interface elements for which ALM data is to be accessible via an ALM overlay. The example ALM system searcher 330 then obtains the ALM data for the matching ALM entities and associates it with the appropriate user interface element(s) based on the interface element identification information. In the illustrated example of FIG. 3, the ALM system searcher 330 accesses information from the ALM interface element storage 320 identifying user interface elements for which ALM data is to be accessible via ALM overlays implemented by ALM clients, such as the ALM overlay clients 115 and/or 115A-C. The ALM system searcher 330 then queries the ALM system(s) 110 via the ALM system interface for ALM entries including the interface element identification information. For example, the ALM system searcher 330 can be configured with the appropriate credentials to access one or more the ALM system(s) 110 via dynamic link libraries, command line interfaces, etc., to access the ALM entities tracked by the ALM system(s) 110. In some examples, the ALM system searcher 330 employs text-based searching techniques to search the ALM system(s) 110 for interface element identification information in the form of XPATH data describing the user interface elements for which ALM data is to be accessible via an ALM overlay. In some examples, the ALM system searcher 330 employs image-based searching techniques (e.g., such as SIFT-based techniques, K-D tree searches, etc.) to search the ALM system(s) 110 for interface element identification information in the form of image data, image vectors, image descriptors, etc.

In some examples, the ALM system searcher 330 searches, in accordance with a schedule, the ALM system(s) 110 for ALM entries containing identification information for one or more, or all, of the application user interface elements maintained in the example ALM interface element storage 320. For example, the ALM system searcher 330 may be configured to perform overnight searches of the ALM system(s) 110 beginning at one or more scheduled times to obtain ALM data for the user interface elements for which identification information is stored in the ALM interface element storage 320. Additionally or alternatively, in some examples, the ALM system searcher 330 searches the ALM system(s) 110 for ALM entries containing identification information for a particular user interface element in response to a request received from an ALM overlay client, such as one of the ALM overlay clients 115 and/or 115A-C (e.g., such as a request provided by the client's interface element navigators 210).

In the illustrated example of FIG. 3, the ALM system indexer 125 includes an example ALM data combiner 335 to combine the results of searching ALM system(s) 110 to form respective combined ALM data for respective application user interface element(s) for which ALM data is to be accessible via an ALM overlay. For example, the ALM data combiner 335 uses the interface element identification information to combine ALM data received from different ALM systems 110 and/or for different ALM entities but associated with a same user interface element to determine the ALM data to be reported to ALM overlay clients for that user interface element. In the illustrated example of FIG. 3, the ALM data combiner 335 (and/or the ALM system searcher 330) stores the ALM data retrieved from the ALM system(s) 110 for respective user interface elements in an example ALM data storage 340. The ALM data storage 340 may be implemented by any number, type(s) and/or combination of data storage elements, memories, etc., such as the example memory 1214 and/or the example storage device(s) 1228 of the example processing system 1200 of FIG. 12, which is described in further detail below.

The example ALM system indexer 125 of FIG. 3 further includes an example ALM data reporter 345 to transmit ALM data associated with user interface elements to requesting ALM overlay clients, such as the ALM overlay clients 115 and/or 115A-C, via the example client interface 305. For example, the ALM data reporter 345 retrieves ALM data associated with a particular user interface element from the ALM data storage 340 and transmits the ALM data to an ALM overlay client for use by the ALM overlay client in presenting an ALM overlay over the user interface of a software application being managed by the ALM system(s) 110. In some examples, the ALM data reporter 345 transmits the ALM data in response to receiving a query from the ALM overlay client (e.g., from the ALM data retriever 225 of the ALM overlay client) containing information identifying the user interface element for which ALM data is requested. The ALM data reporter 345 in such examples uses the interface element identification information included in the query to retrieve the combined ALM data for the particular user interface element from the ALM data storage 340. In some examples, the ALM data reporter 345 uses the interface element identification information included in the query to trigger the ALM system searcher 330 (and possibly the ALM data combiner 335) to obtain the ALM data associated with the particular user interface element from the ALM system(s) 110 (e.g., such as when ALM data for the particular user interface element is not already stored in the ALM data storage 340 and/or when ALM data for the particular user interface element is out-of-date based on an expiration criterion, etc.).

While an example manner of implementing the ALM overlay system 105 is illustrated in FIGS. 1-6, one or more of the elements, processes and/or devices illustrated in FIGS. 1-6 may be combined, divided, re-arranged, omitted, eliminated and/or implemented in any other way. Further, the example ALM system(s) 110, the example ALM overlay clients 115 and/or 115A-C, the example computing devices 120A-C, the example ALM system indexer 125, the example network 130, the example network 135, the example ALM overlay presenter 205, the example interface element navigator 210, the example device I/O interface 215, the example indexer interface 220, the example ALM data retriever 225, the example ALM element creator 230, the example client interface 305, the example ALM system interface 310, the example ALM element manager 315, the example ALM interface element storage 320, the example ALM element tagger 325, the example ALM system searcher 330, the example ALM data combiner 335, the example ALM data storage 340, the example ALM data reporter 345 and/or, more generally, the example ALM overlay system 105 of FIGS. 1-6 may be implemented by hardware, software, firmware and/or any combination of hardware, software and/or firmware. Thus, for example, any of the example ALM system(s) 110, the example ALM overlay clients 115 and/or 115A-C, the example computing devices 120A-C, the example ALM system indexer 125, the example network 130, the example network 135, the example ALM overlay presenter 205, the example interface element navigator 210, the example device I/O interface 215, the example indexer interface 220, the example ALM data retriever 225, the example ALM element creator 230, the example client interface 305, the example ALM system interface 310, the example ALM element manager 315, the example ALM interface element storage 320, the example ALM element tagger 325, the example ALM system searcher 330, the example ALM data combiner 335, the example ALM data storage 340, the example ALM data reporter 345 and/or, more generally, the example ALM overlay system 105 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example ALM overlay system 105, the example ALM system(s) 110, the example ALM overlay clients 115 and/or 115A-C, the example computing devices 120A-C, the example ALM system indexer 125, the example network 130, the example network 135, the example ALM overlay presenter 205, the example interface element navigator 210, the example device I/O interface 215, the example indexer interface 220, the example ALM data retriever 225, the example ALM element creator 230, the example client interface 305, the example ALM system interface 310, the example ALM element manager 315, the example ALM interface element storage 320, the example ALM element tagger 325, the example ALM system searcher 330, the example ALM data combiner 335, the example ALM data storage 340 and/or the example ALM data reporter 345 is/are hereby expressly defined to include a tangible computer readable storage device or storage disk such as a memory, a digital versatile disk (DVD), a compact disk (CD), a Blu-ray disk, etc. storing the software and/or firmware. Further still, the example ALM overlay system 105 of FIGS. 1-6 may include one or more elements, processes and/or devices in addition to, or instead of, those illustrated in FIGS. 1-6, and/or may include more than one of any or all of the illustrated elements, processes and devices.

Flowcharts representative of example machine readable instructions for implementing the example ALM overlay system 105, the example ALM system(s) 110, the example ALM overlay clients 115 and/or 115A-C, the example computing devices 120A-C, the example ALM system indexer 125, the example network 130, the example network 135, the example ALM overlay presenter 205, the example interface element navigator 210, the example device I/O interface 215, the example indexer interface 220, the example ALM data retriever 225, the example ALM element creator 230, the example client interface 305, the example ALM system interface 310, the example ALM element manager 315, the example ALM interface element storage 320, the example ALM element tagger 325, the example ALM system searcher 330, the example ALM data combiner 335, the example ALM data storage 340 and/or the example ALM data reporter 345 are shown in FIGS. 7-10. In these examples, the machine readable instructions comprise one or more programs for execution by a processor, such as the processor 1112 and/or 1212 shown in the example processor platforms 1100 and/or 1200 discussed below in connection with FIGS. 11 and 12. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 1112 and/or 1212, but the entire program or programs and/or portions thereof could alternatively be executed by a device other than the processor 1112 and/or 1212, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 7-10, many other methods of implementing the example ALM overlay system 105, the example ALM system(s) 110, the example ALM overlay clients 115 and/or 115A-C, the example computing devices 120A-C, the example ALM system indexer 125, the example network 130, the example network 135, the example ALM overlay presenter 205, the example interface element navigator 210, the example device I/O interface 215, the example indexer interface 220, the example ALM data retriever 225, the example ALM element creator 230, the example client interface 305, the example ALM system interface 310, the example ALM element manager 315, the example ALM interface element storage 320, the example ALM element tagger 325, the example ALM system searcher 330, the example ALM data combiner 335, the example ALM data storage 340 and/or the example ALM data reporter 345 may alternatively be used. For example, with reference to the flowcharts illustrated in FIGS. 7-10, the order of execution of the blocks may be changed, and/or some of the blocks described may be changed, eliminated, combined and/or subdivided into multiple blocks.

As mentioned above, the example processes of FIGS. 7-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7-10 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

Figure 7:
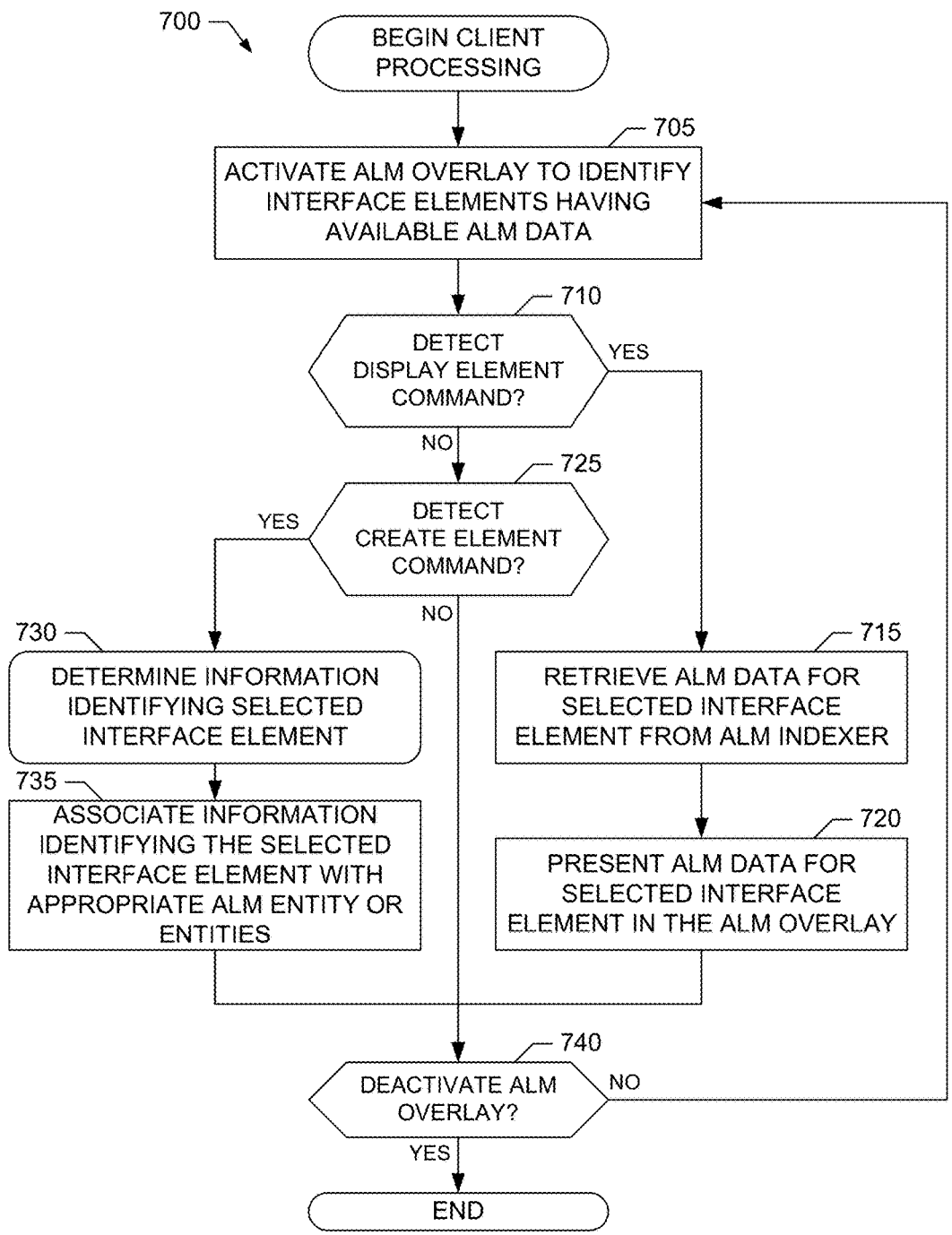
FIG. 7 is a flowchart representative of example machine readable instructions that may be executed to implement the example application lifecycle management overlay client of FIG. 2.

An example program 700 that may be executed to implement one or more of the example ALM overlay clients 115 and/or 115A-C is represented by the flowchart shown in FIG. 7. For convenience and without loss of generality, execution of the example program 700 is described from the perspective of the ALM overlay client 115 of FIG. 2 implementing the ALM overlay client 115A in the example environment of use 100 of FIG. 1. With reference to the preceding figures and associated written descriptions, the example program 700 of FIG. 7 begins execution at block 705 at which the example ALM overlay presenter 205 of the ALM overlay client 115 activates (e.g., in response to a user command) an ALM overlay, as described above, on the computing device 120A to identify (e.g., via the example identifiers 505 and/or 605) interface elements of a software application's user interface which have ALM data that is accessible for presentation. At block 710, the example interface element navigator 210 of the ALM overlay client 115 determines, as described above, whether a detect display element command has been detected. If a detect display element command has been detected (block 710) control proceeds to block 715 at which the example ALM data retriever 225 of the ALM overlay client 115 retrieves, as described above, ALM data from the example ALM system indexer 125 for a user interface element selected by the display element command. At block 720, the ALM overlay presenter 205 presents, as described above, the retrieved ALM data in the overlay (e.g., in the example ALM data window 610).

Figure 8:
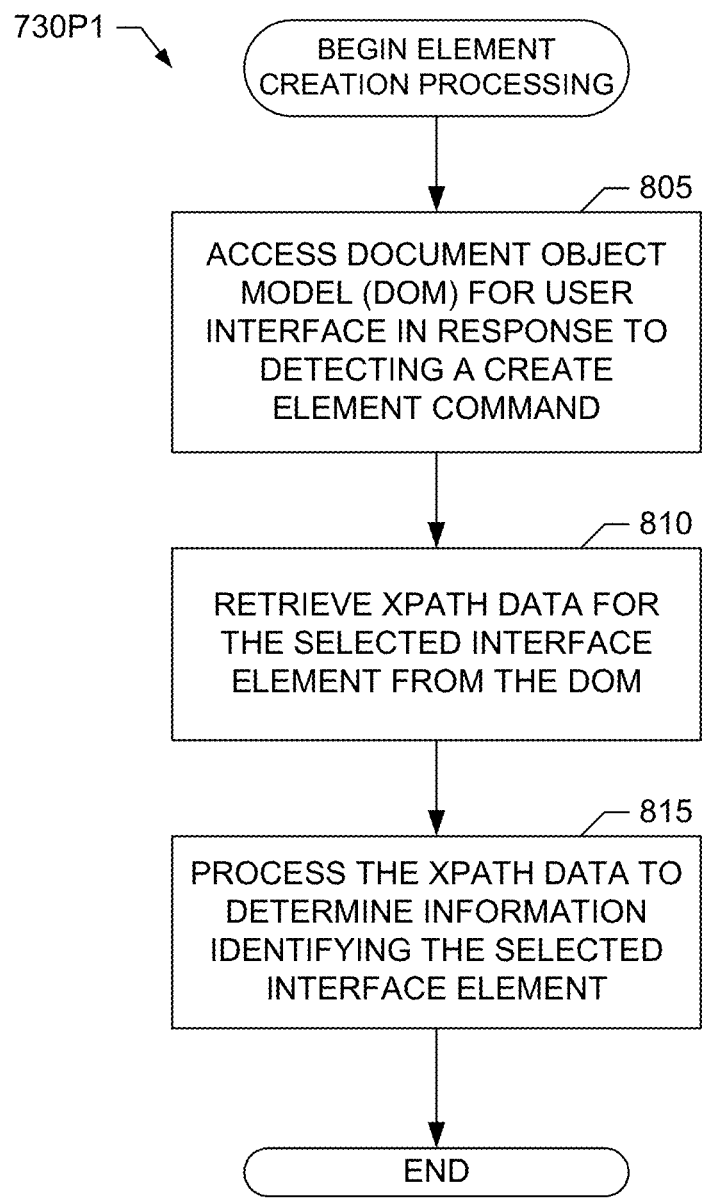
FIG. 8 is a flowchart representative of first example machine readable instructions that may be executed by the example application lifecycle management overlay client of FIG. 3 to determine information identifying a new user interface element to be included in an application lifecycle management overlay.
Figure 9:
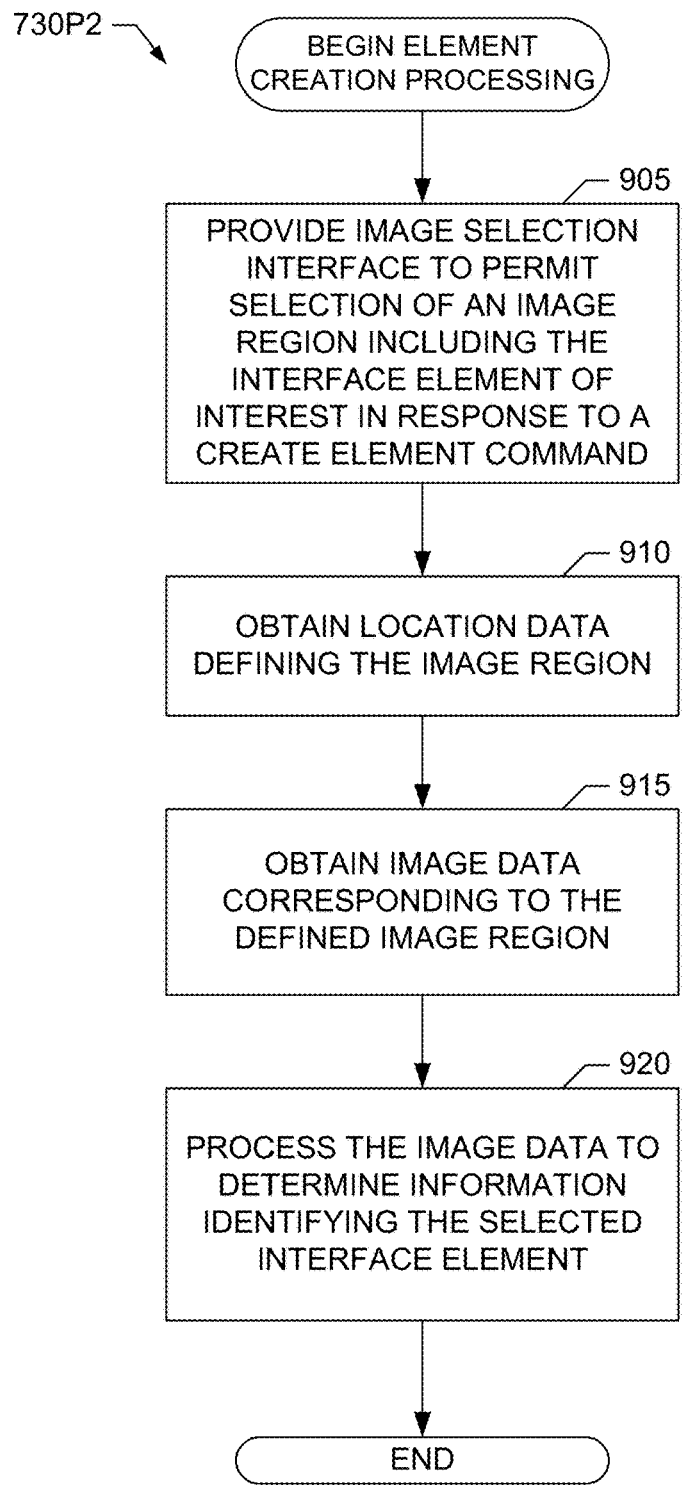
FIG. 9 is a flowchart representative of second example machine readable instructions that may be executed by the example application lifecycle management overlay client of FIG. 3 to determine information identifying a new user interface element to be included in an application lifecycle management overlay.

However, if a detect display element command has not been detected (block 710) control proceeds to block 725 at which the interface element navigator 210 determines, as described above, whether a create element command has been detected. If a create element command has been detected (block 725) control proceeds to block 730 at which the example ALM element creator 230 of the ALM overlay client 115 determines, as described above, information identifying the user interface element selected by the create element command and for which the ALM overlay is to begin supporting ALM data access. Example machine readable instructions that may be used to implement the processing at block 730 are illustrated in FIGS. 8 and 9, which are described in further detail below. At block 735, the information identifying the user interface element selected by the create element command is associated with the appropriate ALM entity or entities related to that user interface element. For example, the information identifying the selected user interface element can be transmitted to the ALM system indexer 125 for storage in the ALM system(s) 110 with the appropriate ALM entity or entities, and/or stored manually in the ALM system(s) 110 with the appropriate ALM entity or entities, as described above.

After processing at blocks 720 or 735 completes, or if a create element command has not been detected (block 725), at block 740 the ALM overlay client 115 determines whether the ALM overlay activated at block 705 is to be deactivated (e.g., in response to a user command). If the ALM overlay is not to be deactivated, execution returns to block 705 and blocks subsequent thereto by which the ALM overlay remains active. Otherwise, the ALM overlay presenter 205 deactivates the ALM overlay and execution of the example program 700 ends.

A first example program 730P1 that may be executed to implement the example ALM element creator 230 of the example ALM overlay client 115 of FIG. 2 and/or to perform the processing at block 730 of FIG. 7 is illustrated in FIG. 8. With reference to the preceding figures and associated written descriptions, the example program 730P1 of FIG. 8 begins execution at block 705 at which the ALM element creator 230 accesses, as described above, a DOM used by the software application to generate its user interface in response to the example interface element navigator 210 of the ALM overlay client 115 detecting a create element command. At block 810, the ALM element creator 230 retrieves XPATH data from the DOM for a user interface element selected by the create element command, as described above. At block 815, the ALM element creator 230 processes (e.g., extracts, formats, compresses, hashes, etc.) the XPATH data to determine information identifying the user interface element selected by the create element command, as described above. Execution of the example program 730P1 then ends.

A second example program 730P2 that may be executed to implement the example ALM element creator 230 of the example ALM overlay client 115 of FIG. 2 and/or to perform the processing at block 730 of FIG. 7 is illustrated in FIG. 9. With reference to the preceding figures and associated written descriptions, the example program 730P2 of FIG. 9 begins execution at block 905 at which the ALM element creator 230 provides a graphical interface, as described above, to permit a user to select an image region including a user interface element that is to be the subject of the create element command. At block 910, the ALM element creator 230 obtains location data defining the image region of the application user interface selected at block 905. At block 910, the ALM element creator 230 obtains image data corresponding to the defined image region including the user interface element of interest. At block 920, the ALM element creator 230 processes the image data, as described above, to determine information identifying the user interface element selected by the create element command. Execution of the example program 730P2 then ends.

Figure 10:
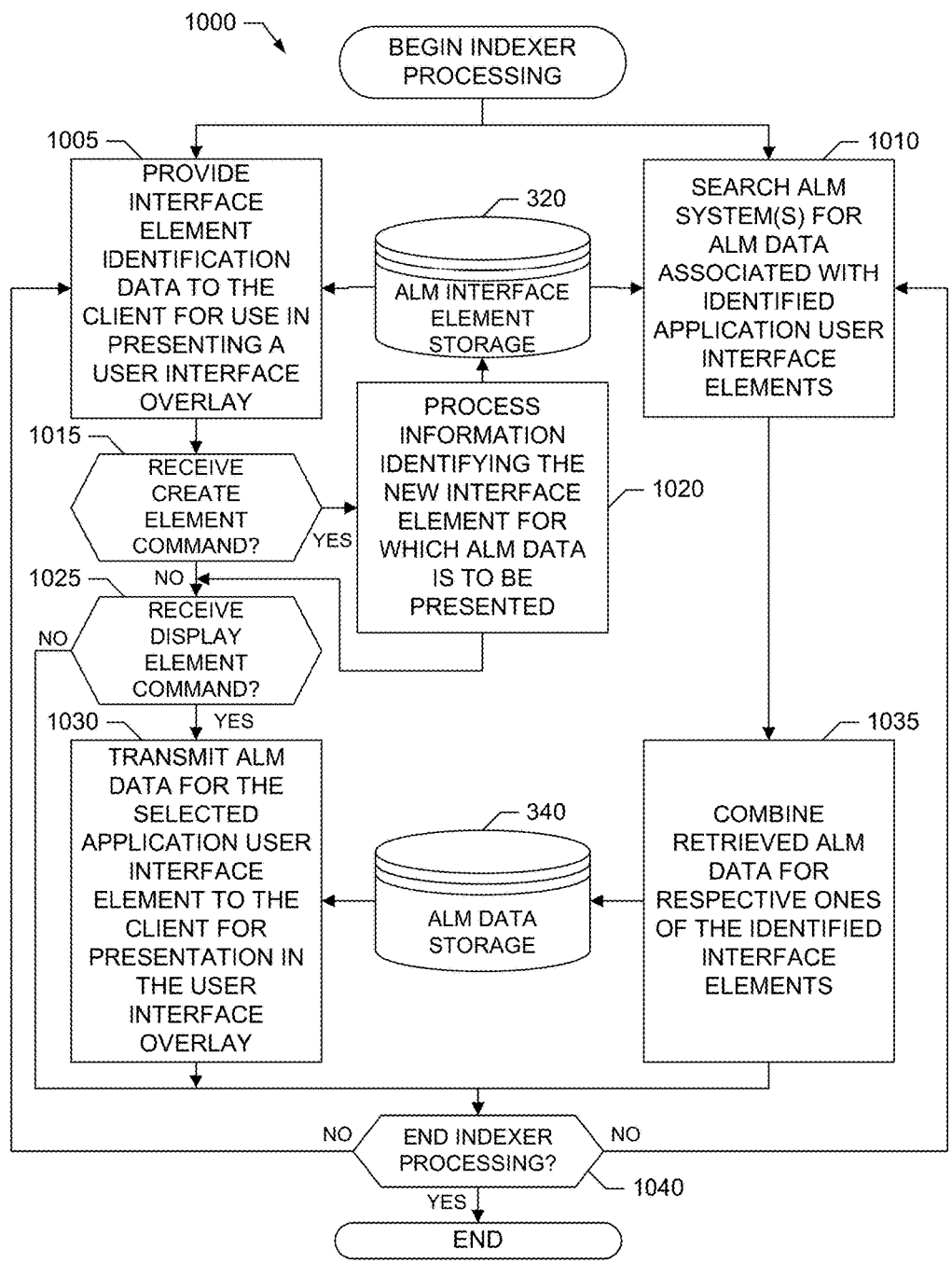
FIG. 10 is a flowchart representative of example machine readable instructions that may be executed to implement the example application lifecycle management system indexer of FIG. 3.

An example program 1000 that may be executed to implement the example ALM system indexer 125 is represented by the flowchart shown in FIG. 10. With reference to the preceding figures and associated written descriptions, the example program 1000 of FIG. 10 begins execution at blocks 1005 and 1010 in parallel. At block 1005, the example ALM element manager 315 of the ALM system indexer 125 retrieves, from the example ALM interface element storage 320, information identifying the user interface element(s) to be supported by an ALM overlay for a given software application. The ALM element manager 315 then transmits this interface element identification information to a requesting ALM overlay client (e.g., such as one of the ALM overlay clients 115 and/or 115A-C) for use in presenting an ALM overlay over the application user interface, as described above. At block 1015, the ALM element manager 315 determines whether a create element command has been received from an ALM overlay client. If a create element command has been received (block 1015), at block 1020 the ALM element manager 315 stores the interface element identification information included with the create element command in the example ALM interface element storage 320. As described above, this interface element identification information identifies a new interface element for which ALM data is to be accessible via an ALM overlay. In some examples, at block 1020 the example ALM element tagger 325 is invoked, as described above, to cause the identification information for the particular interface element to be stored in the ALM system(s) 110 with the appropriate ALM entity or entities to be associated with this user interface element.

However, if a create element command has not been received (block 1015), at block 1025 the ALM element manager 315 determines whether a display element command has been received from an ALM overlay client. If a display element command has been received (block 1025), then at block 1030 the example ALM data reporter 345 of the ALM system indexer 125 retrieves, from the example ALM data storage 340, ALM data for the user interface element identified in the display element command. At block 1030, the ALM data reporter 345 also reports the requested ALM data to the requesting ALM overlay client for presentation in an ALM overlay.

Returning to block 1010, at block 1010 the example ALM system searcher 330 of the ALM system indexer 125 searches the ALM system(s) 110 for ALM data associated with application user interface elements identified in the ALM interface element storage 320, as described above. At block 1035, the example ALM data combiner 335 of the ALM system indexer 125 uses the interface element identification information to combine ALM data retrieved by the ALM system searcher 330 from different ALM systems 110 and/or for different ALM entities but associated with a same user interface element to determine the ALM data to be reported for that user interface element. The ALM data combiner 335 stores this combined ALM data in the ALM data storage 340 for reporting to a requesting ALM overlay client.

After processing at blocks 1030 or 1035 completes, or if a display element command has not been detected (block 1025), at block 740 the ALM system indexer 125 determines whether index processing is to end (e.g., in response to a user command). If indexer processing is not to end (block 1040), execution returns to blocks 1005 and 1010, and blocks subsequent thereto, by which the ALM system indexer 125 remains active. Otherwise, the ALM system indexer 125 is deactivated and execution of the example program 1000 ends.

Figure 11:
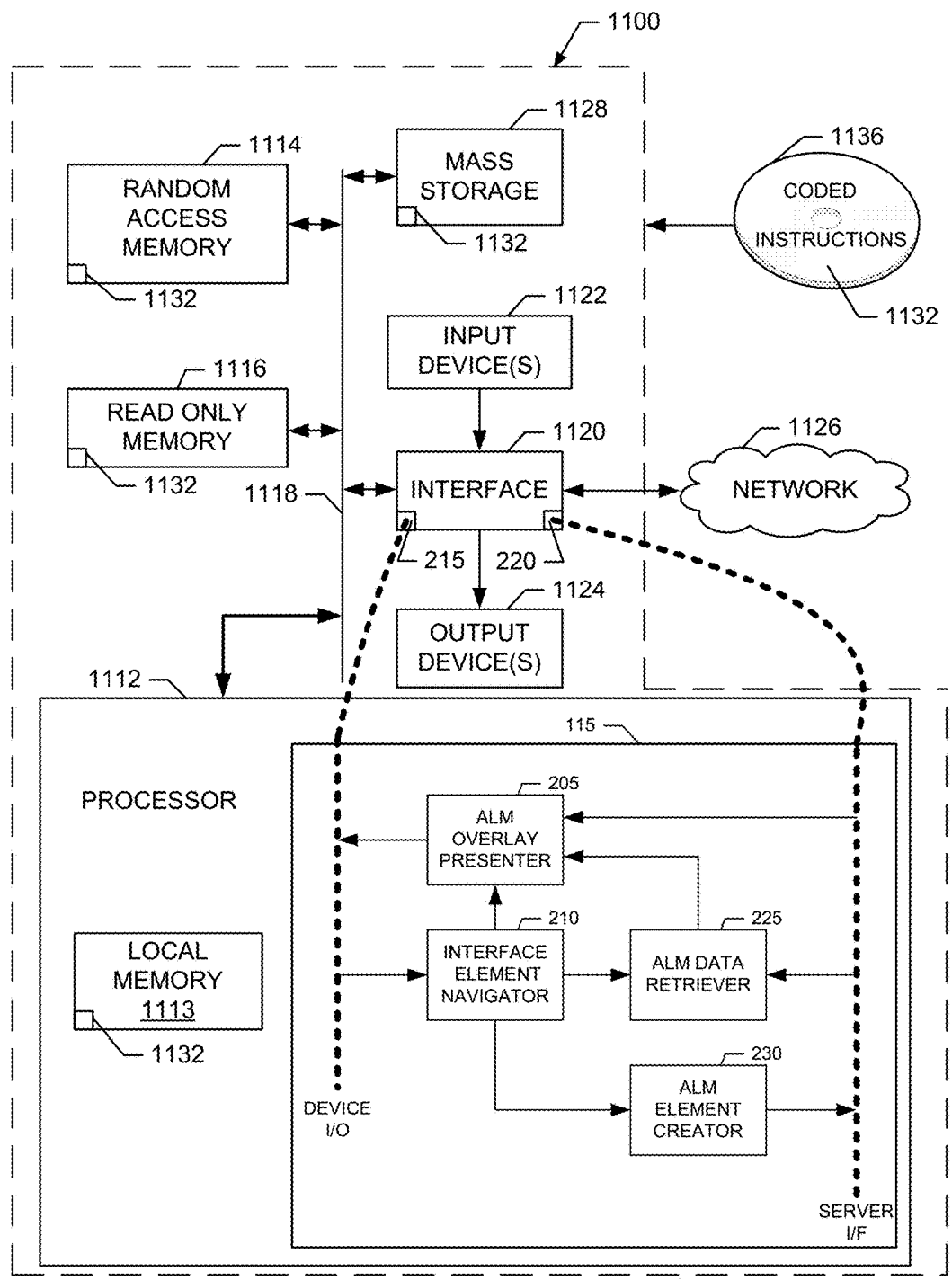
FIG. 11 is a block diagram of a first example processor platform structured to execute the example machine readable instructions of FIGS. 7-8 and/or 9 to implement the example application lifecycle management overlay client of FIG. 2.

FIG. 11 is a block diagram of an example processor platform 1100 structured to execute the instructions of FIGS. 7, 8 and/or 9 to implement the example ALM overlay clients 115 and/or 115A-C, the example interface element navigator 210, the example device I/O interface 215, the example indexer interface 220, the example ALM data retriever 225 and/or the example ALM element creator 230 of FIGS. 1-2. The processor platform 1100 can be, for example, a server, a personal computer, a mobile device (e.g., a cell phone, a smart phone, a tablet such as an iPad™), a personal digital assistant (PDA), an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In the illustrated example of FIG. 11, the processor 1112 is configured to implement the example ALM overlay client 115, the example interface element navigator 210, the example ALM data retriever 225 and the example ALM element creator 230 of FIG. 2.

The processor 1112 of the illustrated example includes a local memory 1113 (e.g., a cache). The processor 1112 of the illustrated example is in communication with a main memory including a volatile memory 1114 and a non-volatile memory 1116 via a link 1118. The link 1118 may be implemented by a bus, one or more point-to-point connections, etc., or a combination thereof. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1100, can allow the user to control the computer system and provide data to the computer using physical gestures, such as, but not limited to, hand or body movements, facial expressions, and face recognition.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126

(e.g., an Ethernet connection, a digital subscriber line (DSL), a telephone line, coaxial cable, a cellular telephone system, etc.). In the illustrated example of FIG. 11, the interface circuit 1120 is configured to implement the example device I/O interface 215 and the example indexer interface 220 of FIG. 2.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID (redundant array of independent disks) systems, and digital versatile disk (DVD) drives.

Coded instructions 1132 corresponding to the instructions of FIGS. 7, 8 and/or 9 may be stored in the mass storage device 1128, in the volatile memory 1114, in the non-volatile memory 1116, in the local memory 1113 and/or on a removable tangible computer readable storage medium, such as a CD or DVD 1136.

Figure 12:
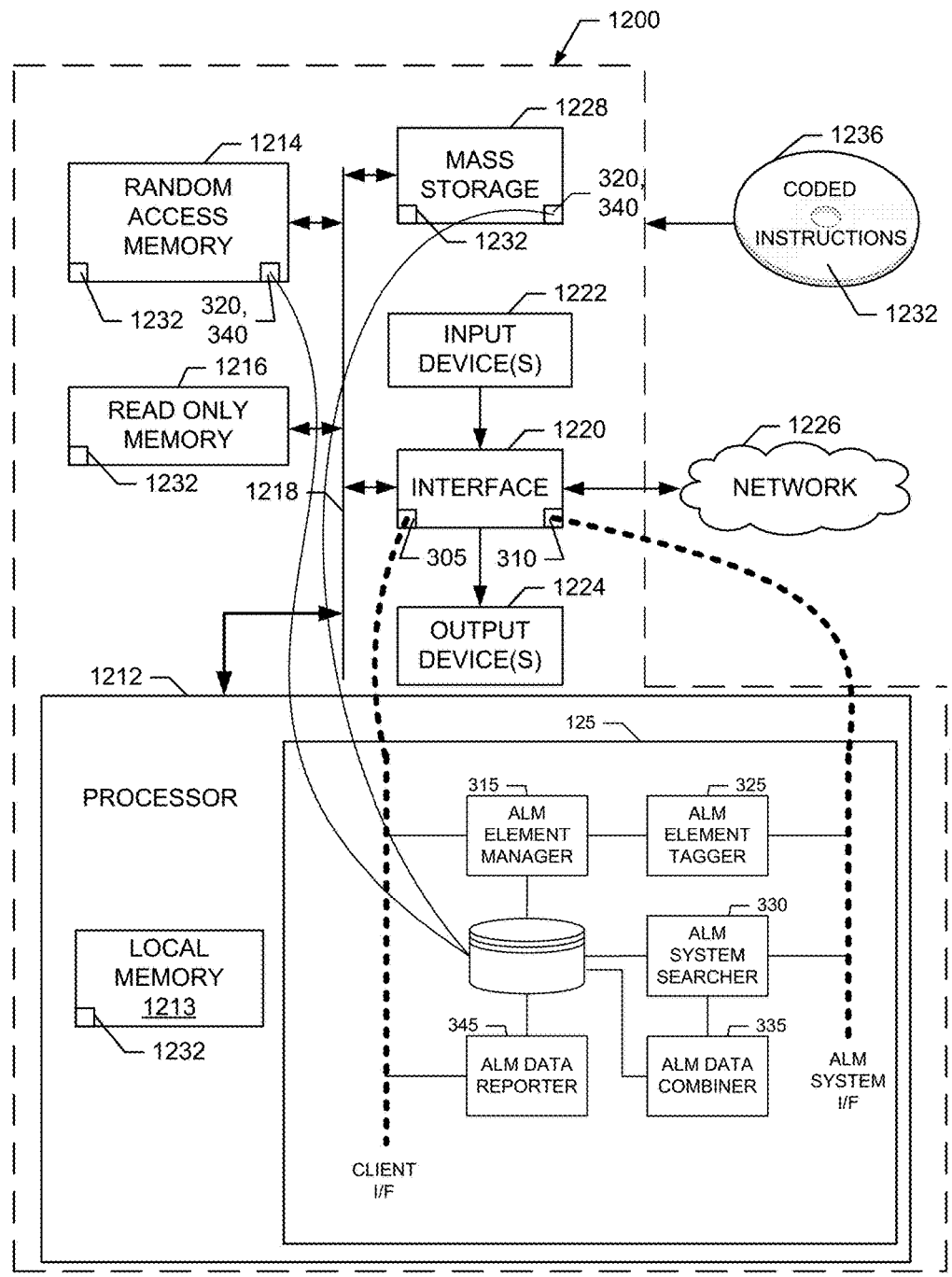
FIG. 12 is a block diagram of a second example processor platform structured to execute the example machine readable instructions of FIG. 10 to implement the example application lifecycle management system indexer of FIG. 3.

FIG. 12 is a block diagram of an example processor platform 1200 structured to execute the instructions of FIG. 10 to implement the example ALM system indexer 125, the example client interface 305, the example ALM system interface 310, the example ALM element manager 315, the example ALM interface element storage 320, the example ALM element tagger 325, the example ALM system searcher 330, the example ALM data combiner 335, the example ALM data storage 340 and/or the example ALM data reporter 345 of FIGS. 1 and 3. The processor platform 1200 can be, for example, a server, a personal computer, a mobile device (e.g., a cell phone, a smart phone, a tablet such as an iPad™), a personal digital assistant (PDA), an Internet appliance, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. In the illustrated example of FIG. 12, the processor 1212 is configured to implement the example ALM system indexer 125, the example ALM element manager 315, the example ALM element tagger 325, the example ALM system searcher 330, the example ALM data combiner 335 and the example ALM data reporter 345 of FIG. 3.

The processor 1212 of the illustrated example includes a local memory 1213 (e.g., a cache). The processor 1212 of the illustrated example is in communication with a main memory including a volatile memory 1214 and a non-volatile memory 1216 via a link 1218. The link 1218 may be implemented by a bus, one or more point-to-point connections, etc., or a combination thereof. The volatile memory 1214 may be implemented by SDRAM, DRAM, RDRAM and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a USB, and/or a PCI express interface.

In the illustrated example, one or more input devices 1222 are connected to the interface circuit 1220. The input device(s) 1222 permit(s) a user to enter data and commands into the processor 1212. The input device(s) can be imple-
mented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1200, can allow the user to control the computer system and provide data to the computer using physical gestures, such as, but not limited to, hand or body movements, facial expressions, and face recognition.

One or more output devices 1224 are also connected to the interface circuit 1220 of the illustrated example. The output devices 1224 can be implemented, for example, by display devices (e.g., an LED, an OLED, a liquid crystal display, a CRT, a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a DSL, a telephone line, coaxial cable, a cellular telephone system, etc.). In the illustrated example of FIG. 12, the interface circuit 1220 is configured to implement the example client interface 305 and the example ALM system interface 310 of FIG. 3.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and DVD drives.

In the illustrated example of FIG. 12, one or more of the volatile memory 1214 and the mass storage device(s) 1228 is/are configured to implement the example ALM interface element storage 320 and the example ALM data storage 340 of FIG. 3.

Coded instructions 1232 corresponding to the instructions of FIG. 10 may be stored in the mass storage device 1228, in the volatile memory 1214, in the non-volatile memory 1216, in the local memory 1213 and/or on a removable tangible computer readable storage medium, such as a CD or DVD 1236.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to present application lifecycle management data, the method comprising:

searching a plurality of application lifecycle management systems for application lifecycle management data associated with a software application;

based on information identifying an element of a graphical user interface, determining, by executing an instruction with a processor, a region of the graphical user interface in which the element appears, the graphical user interface generated by the software application, a product lifecycle of the software application managed by the plurality of application lifecycle management systems, different ones of the plurality of application lifecycle management systems managing different aspects of the product lifecycle of the software application;

generating, by executing an instruction with the processor, an overlay, the overlay including an element identifier, the overlay generated by an application lifecycle management overlay system, the element identifier indicating that application lifecycle management data associated with the element is available for presentation, the application lifecycle management data generated by at least two of the plurality of application lifecycle management systems, and the application lifecycle management data pertaining to a feature of the software application corresponding to the element, the feature of the software application accessible to a user via the element of the graphical user interface;

causing, by executing an instruction with the processor, a display to present the overlay on top of a portion of the graphical user interface to provide the graphical user interface as a navigation tool to access the application lifecycle management data associated with the feature, the element identifier to appear in the region of the graphical user interface containing the element when the overlay is presented on top of the portion of the graphical user interface;

presenting, by executing an instruction with the processor, the application lifecycle management data in the overlay in response to detecting a first input command while the overlay is active; and if the first input command has not been detected, deactivating the overlay generated by the application lifecycle management overlay system.

2. A method as defined in claim 1, wherein the element identifier of the overlay includes a graphical icon to identify the element of the graphical user interface for which the application lifecycle management data is available.

3. A method as defined in claim 2, wherein the detecting of the first input command includes determining that a position of a mouse pointer corresponds to the region including the graphical icon.

4. A method as defined in claim 1, wherein the element is a first element, and the method further includes:
determining information identifying a second element of the graphical user interface in response to detecting a second input command while the overlay is active; and
associating the information with a plurality of application lifecycle management entities maintained by the plurality of application lifecycle management systems.

5. A method as defined in claim 4, wherein the determining of the information includes:
accessing a document object model associated with the graphical user interface; and
obtaining the information from XPATH data describing the second element in the document object model.

6. A method as defined in claim 4, wherein the determining of the information includes:
obtaining image data for an image depicting the second element of the graphical user interface; and
processing the image data to determine the information identifying the second element.

7. A method as defined in claim 4, wherein the associating of the information with the plurality of application lifecycle management entities includes transmitting the information to a remote server, the remote server to store the information with respective data corresponding to respective ones of the plurality of application lifecycle management entities.

8. A tangible machine readable storage medium comprising machine readable instructions which, when executed, cause a machine to at least:

search a plurality of application lifecycle management systems for application lifecycle management data associated with a software application, a product lifecycle of the software application managed by the plurality of application lifecycle management systems;

based on information identifying an element of a graphical user interface, determine a region of the graphical user interface in which the element is located, the graphical user interface generated by the software application, and the element corresponding to a feature of the software application, the feature accessible to a user via the element, different ones of the plurality of application lifecycle management systems managing different aspects of the product lifecycle of the software application;

generate an overlay, the overlay including an element identifier, the overlay generated by an application lifecycle management overlay system, the element identifier, indicating that at least some of the application lifecycle management data is associated with the element and is available for presentation, the application lifecycle management data generated by at least two of the plurality of application lifecycle management systems, and the application lifecycle management data pertaining to a feature of the software application corresponding to the element, the feature of the software application accessible to a user via the element of the graphical user interface;

present, on a display, the overlay on top of a portion of the graphical user interface to provide the graphical user interface as a navigation tool for accessing the at least some of the application lifecycle management data, the element identifier to appear in the region of the graphical user interface containing the element when the overlay is presented on top of the portion of the graphical user interface; and present the at least some of the application lifecycle management data in the overlay in response to detecting a first input command while the overlay is active; and if the first input command has not been detected, deactivate the overlay generated by the application lifecycle, management overlay system.

9. A storage medium as defined in claim 8, wherein the element identifier of the overlay includes a graphical icon to identify the element of the graphical user interface for which the application lifecycle management data is available.

10. A storage medium as defined in claim 9, wherein to detect the first input command, the machine readable instructions, when executed, further cause the machine to determine that a position of a mouse pointer corresponds to the region including the graphical icon.

11. A storage medium as defined in claim 8, wherein the element is a first element and the application lifecycle management system is one of a plurality of application lifecycle management systems managing the application, and the machine readable instructions, when executed, further cause the machine to:
determine information identifying a second element of the graphical user interface in response to detecting a second input command while the overlay is active; and
associate the information with a plurality of application lifecycle management entities maintained by the plurality of application lifecycle management systems.

12. A storage medium as defined in claim 11, wherein to determine the information, the machine readable instructions, when executed, further cause the machine to:

access a document object model associated with the graphical user interface; and obtain the information from XPATH data describing the second element in the document object model.

13. A storage medium as defined in claim 11, wherein to determine the information, the machine readable instructions, when executed, further cause the machine to:

obtain image data for an image depicting the second element of the graphical user interface; and process the image data to determine the information identifying the second element.

14. A storage medium as defined in claim 11, wherein to associate the information with the plurality of application lifecycle management entities, the machine readable instructions, when executed, further cause the machine to transmit the information to a remote server, the remote server to store the information with respective data corresponding to respective ones of the plurality of application lifecycle management entities.

15. An apparatus for application lifecycle management, the apparatus comprising:

an overlay presenter, including a hardware processor in communication with a memory including instructions, the instructions to cause the overlay presenter to at least:

search a plurality of application lifecycle management systems for application lifecycle management data associated with a software application, a product lifecycle of the software application managed by the plurality of application lifecycle management systems;

based on information identifying an element of a graphical user interface, determine a region of the graphical user interface in which the element is located, the graphical user interface generated by an application managed by an application lifecycle management system, and the element corresponding to a feature of the software application, the feature accessible to a user via the element, different ones of the plurality of application lifecycle management systems managing different aspects of the product lifecycle of the software application;

generate an overlay, the overlay including an element identifier, the overlay generated by the application lifecycle management system, the element identifier indicating that application lifecycle management data associated with the element is available for presentation, the application lifecycle management data generated by by at least two of the plurality of application lifecycle management systems, and the application lifecycle management data pertaining to a feature of the software application corresponding to the element, the feature of the software application accessible to a user via the element of the graphical user interface; and present, on a display, the overlay on top of a portion of the graphical user interface to provide the graphical user interface as a navigation tool for accessing application lifecycle data associated with the element, the element identifier to appear in the region of the graphical user interface containing the element when the overlay is presented on top of the portion of the graphical user interface;

present the application lifecycle management data in the overlay in response to detecting a first input command while the overlay is active; and if the first input command has not been detected, deactivate the overlay; and an interface element navigator to detect the first input command.

16. An apparatus as defined in claim 15, wherein the element identifier of the overlay includes a graphical icon to identify the element of the graphical user interface for which the application lifecycle management data is available.

17. An apparatus as defined in claim 15, wherein the element is a first element and the application lifecycle management system is one of a plurality of application lifecycle management systems managing the application, the apparatus further including an element creator to:

determine information identifying a second element of the graphical user interface in response to detecting a second input command while the overlay is active; and associate the information with a plurality of application lifecycle management entities maintained by the plurality of application lifecycle management systems.

18. An apparatus as defined in claim 17, wherein to determine the information, the element creator is further to:

access a document object model associated with the graphical user interface; and obtain the information from XPATH data describing the second element in the document object model.

19. An apparatus as defined in claim 17, wherein to determine the information, the element creator is further to:

obtain image data for an image depicting the second element of the graphical user interface; and process the image data to determine the information identifying the second element.

20. An apparatus as defined in claim 17, wherein to associate the information with the plurality of application lifecycle management entities, the element creator is further to transmit the information to a remote server, the remote server to store the information with respective data corresponding to respective ones of the plurality of application lifecycle management entities.

* * * * *

UNITED STATES PATENT AND TRADEMARK OFFICE
CERTIFICATE OF CORRECTION

PATENT NO. : 10,282,177 B2
APPLICATION NO. : 14/667227
DATED : May 7, 2019
INVENTOR(S) : Al Yaros Page 1 of 1

It is certified that error appears in the above-identified patent and that said Letters Patent is hereby corrected as shown below:

In the Claims

Column 26, Line 42, Claim 8:
After "lifecycle" remove --,--

Column 27, Line 49, Claim 15:
After "generated by" remove --by--

Signed and Sealed this
Twelfth Day of May, 2020

Andrei Iancu
*Director of the United States Patent and Trademark Office*